US007142881B2

(12) United States Patent
Sekino et al.

(10) Patent No.: US 7,142,881 B2
(45) Date of Patent: Nov. 28, 2006

(54) COMMUNICATIONS SYSTEM

(75) Inventors: Toru Sekino, Kawasaki (JP); Toru Imamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 417 days.

(21) Appl. No.: 10/373,496

(22) Filed: Feb. 20, 2003

(65) Prior Publication Data
US 2003/0147427 A1 Aug. 7, 2003

Related U.S. Application Data

(63) Continuation of application No. PCT/JP00/05589, filed on Aug. 21, 2000.

(51) Int. Cl.
*H04M 1/00* (2006.01)
*H04Q 7/20* (2006.01)
*H04L 12/66* (2006.01)

(52) U.S. Cl. .................. 455/550.1; 455/424; 455/445; 455/517; 370/352; 704/270

(58) Field of Classification Search ................ 455/445, 455/415, 560, 453, 550.1, 517, 553; 370/278, 370/320, 503, 535, 212, 214; 704/212, 214, 704/219, 270, 221, 228; 379/219, 229, 406.1
See application file for complete search history.

(56) References Cited

U.S. PATENT DOCUMENTS

| | | | |
|---|---|---|---|
| 5,513,211 A | | 4/1996 | Yabusaki et al. |
| 5,774,856 A * | | 6/1998 | Haber et al. ................ 704/270 |
| 5,793,810 A * | | 8/1998 | Han et al. .................... 375/242 |
| 5,987,327 A * | | 11/1999 | Lev et al. .................... 455/445 |
| 5,991,642 A * | | 11/1999 | Watanabe et al. ........... 455/560 |
| 6,006,189 A * | | 12/1999 | Strawczynski et al. ..... 704/270 |
| 6,108,560 A * | | 8/2000 | Navaro et al. .............. 455/517 |
| 6,161,085 A * | | 12/2000 | Haavisto et al. ............ 704/201 |
| 6,215,996 B1 * | | 4/2001 | Fujita ....................... 455/422.1 |
| 6,256,612 B1 * | | 7/2001 | Vo et al. ..................... 704/500 |
| 6,512,924 B1 * | | 1/2003 | Sawada et al. ........... 455/435.1 |
| 6,577,637 B1 * | | 6/2003 | Sieppi ........................ 370/401 |

(Continued)

FOREIGN PATENT DOCUMENTS

JP 7-336394 12/1995

(Continued)

OTHER PUBLICATIONS

Yasuda et al. Network Functions for the Application of Multi-Rate Speech Coding in Digital Cellular Systems. VTC 1994, pp. 306-310 vol. 1 Jun. 8.

*Primary Examiner*—Charles N. Appiah
(74) *Attorney, Agent, or Firm*—Katten Muchin Rosenman LLP

(57) ABSTRACT

When communications between mobile terminals MS1 and MS2 are terminated, a TRAU1 judges whether the communications between mobile terminals MS1 and MS2 are synchronous and notifies the mobile terminal MS1 of this information through both a base station control center BSC1 and a base station BTS. The mobile terminal MS1 stores this information in relation to both the dial number of the mobile terminal MS2 and a voice-encoding type used in communications with the mobile terminal MS2. Similarly, a TRAU2 transmits the same information to the mobile terminal MS2 and the mobile terminal MS2 stores this information along with the dial number of the mobile terminal MS1 and a voice-encoding type. When the mobile terminals MS1 and MS2 communicate the second time, communications are conducted using another voice-encoding type if the communications are asynchronous and using the previous voice-encoding type if the communications are synchronous, based on the information stored in this way.

15 Claims, 20 Drawing Sheets

U.S. PATENT DOCUMENTS

| | | | |
|---|---|---|---|
| 6,665,402 B1 * | 12/2003 | Yue et al. | 379/406.04 |
| 6,751,477 B1 * | 6/2004 | Alperovich et al. | 455/560 |
| 6,785,339 B1 * | 8/2004 | Tahernezhaadi et al. | 375/241 |
| 6,810,256 B1 * | 10/2004 | Stuempert et al. | 455/439 |
| 6,839,557 B1 * | 1/2005 | Bonnard et al. | 455/422.1 |
| 6,879,833 B1 * | 4/2005 | Oh et al. | 455/445 |

FOREIGN PATENT DOCUMENTS

| | | |
|---|---|---|
| JP | 9-116962 | 5/1997 |
| JP | 11-503582 | 3/1999 |
| JP | 2000-69556 | 3/2000 |
| WO | WO 97/20440 | 6/1997 |

\* cited by examiner

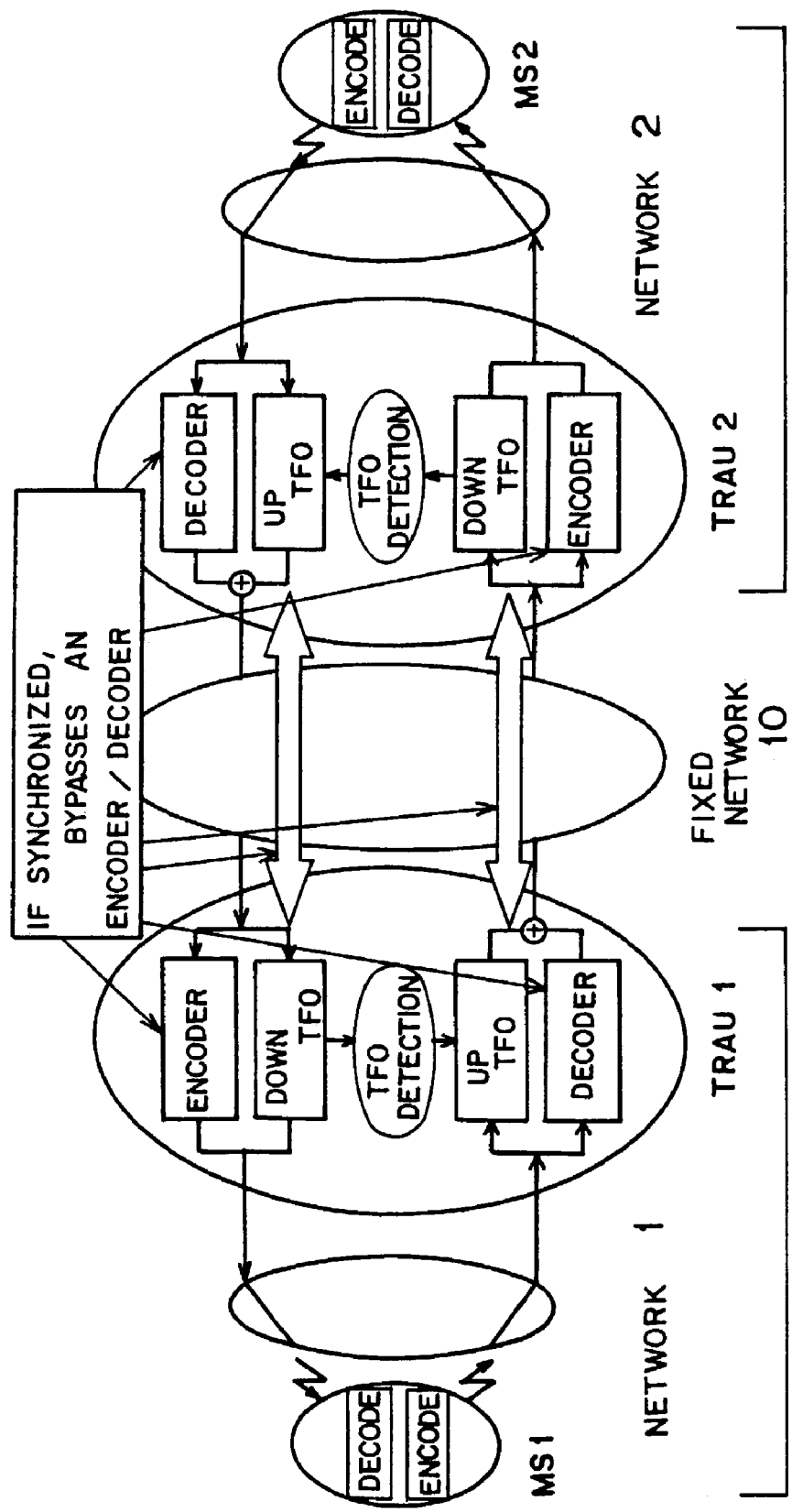
F I G. 1

AN EXAMPLE OF THE DATA FORMAT OF A
SWITCHING SIDE SIGNAL
(IN THE CASE OF A THROUGH-MODE)

| | B1 | B2 | B3 | B4 | B5 | B6 | B7 | B8 |
|---|---|---|---|---|---|---|---|---|
| F 0 | | | | | | | | F 0 |
| F 1 | | | | | | | | F 1 |
| F 2 | | | | | | | | F 2 |
| F 3 | | | | | | | | F 3 |
| F 14 | | | | | | | | F 14 |
| F 15 | | | | | | | | F 15 |
| F 16 | | | | | | | ///// | ///// |
| F 17 | | | | | | | ///// | ///// |
| F 18 | | | | | | | ///// | ///// |
| F 19 | | | | | | | ///// | ///// |
| F120 | | | | | | | ///// | ///// |
| F121 | | | | | | | ///// | ///// |
| F122 | | | | | | | ///// | ///// |
| F123 | | | | | | | ///// | ///// |
| F124 | | | | | | | ///// | ///// |
| F125 | | | | | | | ///// | ///// |
| F126 | | | | | | | ///// | ///// |
| F127 | | | | | | | ///// | ///// |
| F128 | | | | | | | ///// | ///// |
| F135 | X 1 | X 2 | X 3 | X 4 | X 5 | X 6 | | |
| F136 | X 7 | X 8 | X 9 | X10 | X11 | X12 | | |
| F137 | X13 | X14 | X15 | X16 | X17 | X18 | | |
| F138 | X19 | X20 | X21 | X22 | X23 | X24 | | |
| F155 | X121 | X122 | X123 | X124 | X125 | X126 | | |
| F156 | X127 | X128 | X129 | X130 | X131 | X132 | | |
| F157 | X133 | X134 | X135 | X136 | X137 | X138 | | |
| F158 | X139 | X140 | X141 | | | | | |
| F159 | | | | | | | | |

INFORMATION OF A LOW BIT RATE (V.SELP) IS SUPERIMPOSED ON THIS PART AT THE TIME OF CODEC-THROUGH

F0~15 : FLAME SYNCHRONIZATION PATTERN FOR RADIO CHANNELS
V. SELP SIGNAL : C36A(h)
NON-VOICE : 3C95(h)
X1~X141 : DATA PART FOR SWITCHING OFFICE MULTI-RATE DATA TRANSMISSION
IDLE BIT : Don't Care

FIG. 3

Table 12: TFO Frame Structure for CDMA EVRC speech codec

| Octet no. (n) | Bit number (m) | | | | | | | |
|---|---|---|---|---|---|---|---|---|
| | 1 | 2 | 3 | 4 | 5 | 6 | 7 | 8 |
| 0 | 0 | S1 | 0 | S2 | 0 | S3 | 0 | S4 |
| 1 | 0 | S5 | 0 | S6 | 0 | S7 | 0 | S8 |
| 2 | 1 | C1 | C2 | C3 | C4 | C5 | C6 | C7 |
| 3 | C8 | C9 | C10 | C11 | C12 | C13 | C14 | C15 |
| 4 | 1 | D1 | D2 | D3 | D4 | D5 | D6 | D7 |
| 5 | | | | | | | | |
| 6 | 1 | | | | | | | |
| 7 | | | | | | | | |
| 8 | 1 | | | | | | | |
| 9 | | | | | | | | |
| 10 | 1 | | | | | | | |
| 11 | | | | | | | | |
| 12 | 1 | | | | | | | |
| 13 | | | | | | | | |
| 14 | 1 | | | Other D bits | | | | |
| 15 | | | | | | | | |
| 16 | 1 | | | | | | | |
| 17 | | | | | | | | |
| 18 | 1 | | | | | | | |
| 19 | | | | | | | | |
| 20 | 1 | | | | | | | |
| 21 | | | | | | | | |
| 22 | 1 | | | | | | | |
| 23 | | | | | | | | |
| 24 | 1 | | | | | | | |
| 25 | | | | | | | | |
| 26 | 1 | | | | | | | |
| 27 | | | | | | | | |
| 28 | 1 | D181 | D182 | D183 | D184 | D185 | D186 | D187 |
| 29 | D188 | D189 | D190 | D191 | D192 | C16 | C17 | C18 |
| 30 | 1 | C19 | C20 | C21 | C22 | C23 | C24 | C25 |
| 31 | | | | | | | | |
| 32 | 1 | | | | | | | |
| 33 | | | | | | | | |
| 34 | 1 | | | Other C bits | | | | |
| 35 | | | | | | | | |
| 36 | 1 | | | | | | | |
| 37 | | | | | | | | |
| 38 | 1 | C79 | C80 | C81 | C82 | C83 | C84 | C85 |
| 39 | C86 | C87 | C88 | C89 | T1 | T2 | T3 | T4 |

(2) IF OK IS OBTAINED IN THE NEGOTIATION, INFORMATION OF A LOW BIT RATE IS SUPERIMPOSED ON THIS PART (1) NEGOTIATES USING A VOICE BAND SIGNAL USING THIS PART

FIG. 4

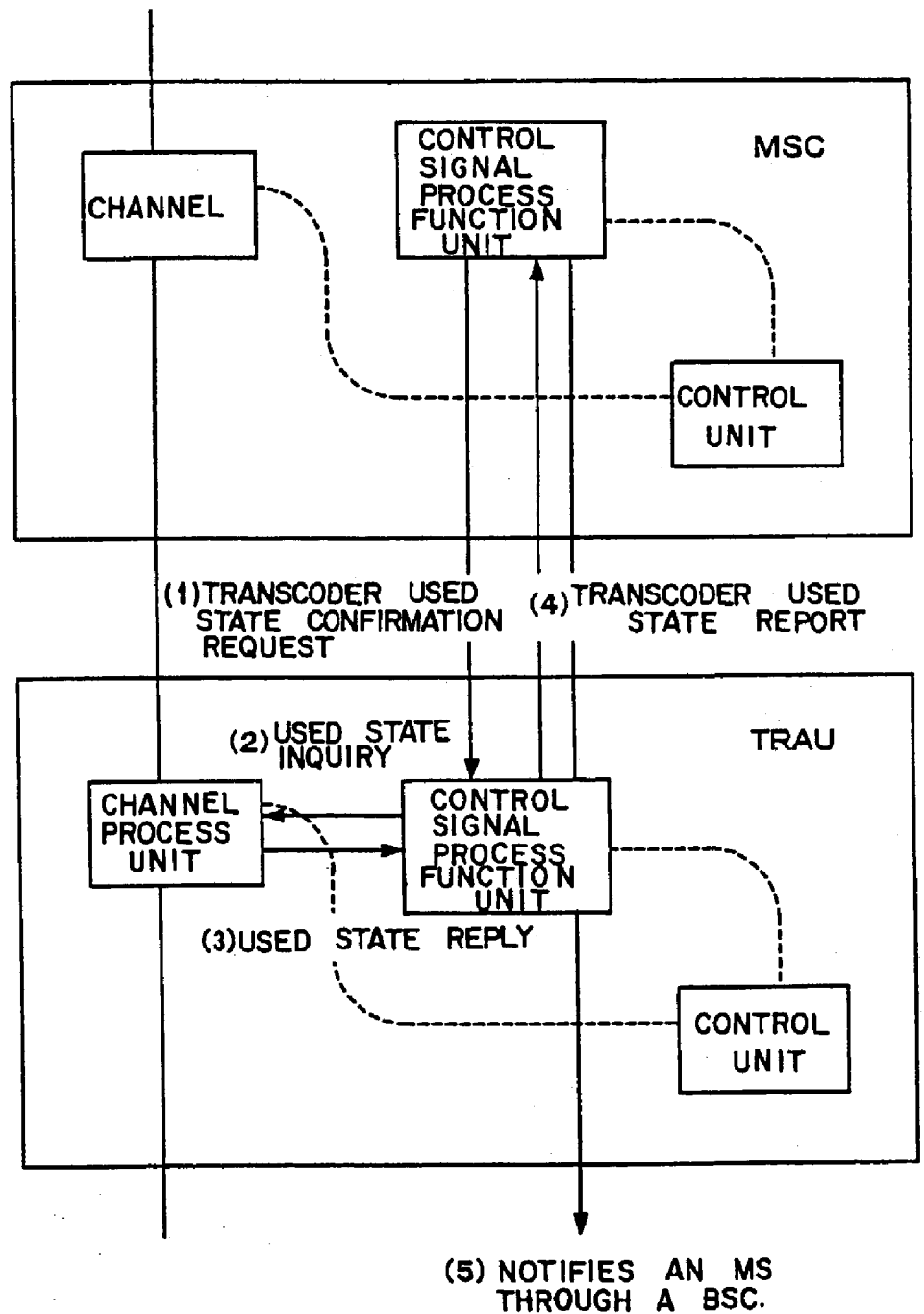
F I G. 7

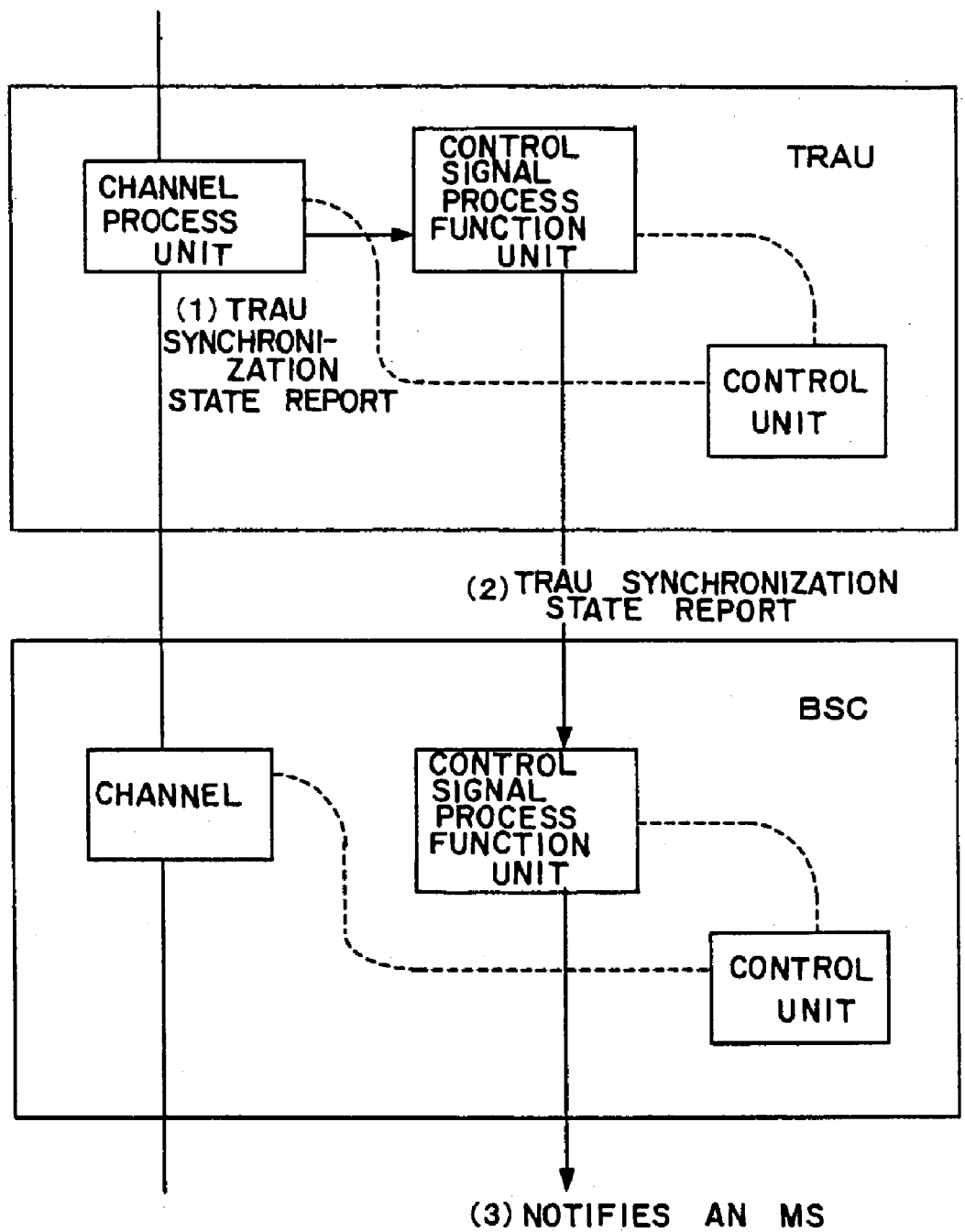
F I G. 12

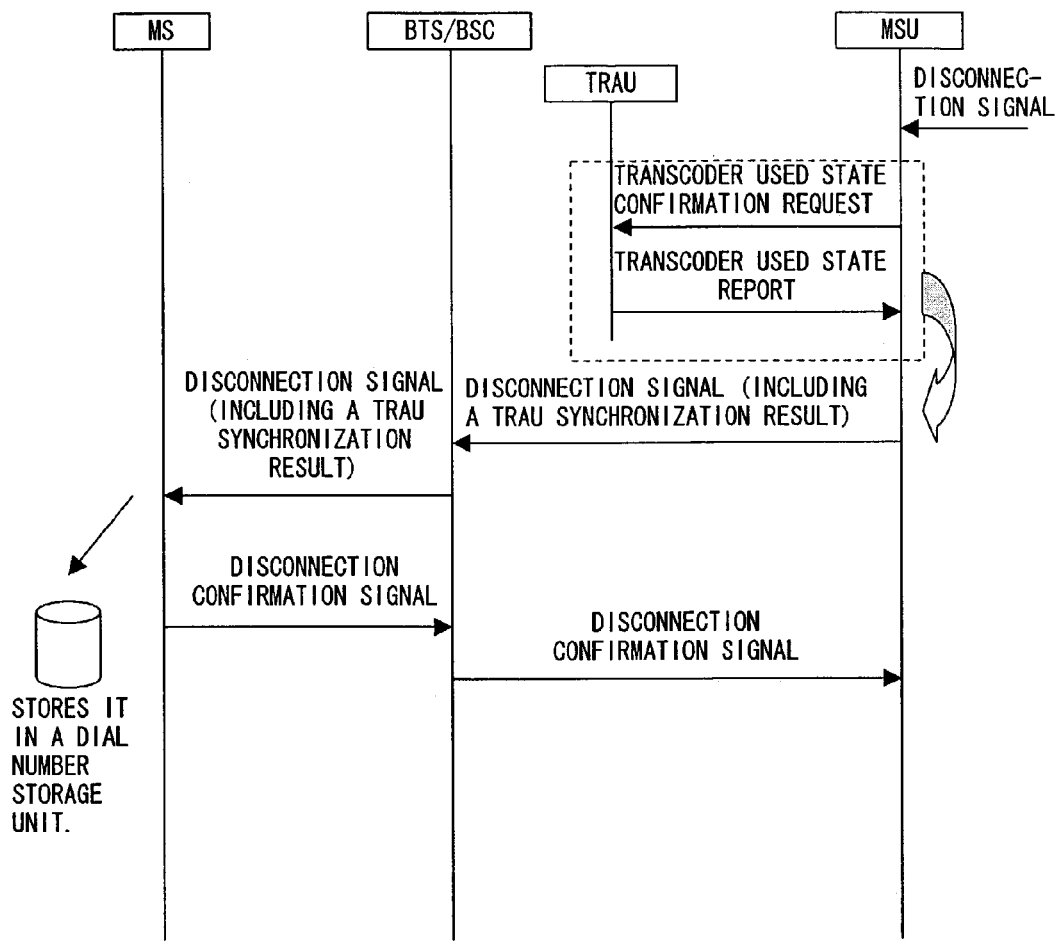
F I G. 20 ns System

CROSS REFERENCE TO RELATED APPLICATION

This application is a continuation of International PCT Application NO. PCT/JP00/05589 filed on Aug. 21, 2000.

BACKGROUND OF THE INVENTION

1. Field of the Invention

The present invention relates to a communications system utilizing a TFO function.

2. Description of the Related Art

Recently, the mainstream of the mobile communications system field has been a digital mobile communications system for digitizing voice and data and transmitting the digitized voice and data. Since a mobile terminal is provided with a memory dial function, a call can also be originated using a phone number registered in the memory dial if recently a call has been originated from the mobile terminal.

In a mobile communications network, the most restricted resources are a radio section between a mobile terminal and a base station. To reduce a required bandwidth in a radio section, a voice encoding system for reducing the transmission rate of 64 kbps usually used in an ordinary telephone network to a low transmission rate of 9.6 kbps and the like, is used for voice transmission. In the case of a voice-encoder operation, both a mobile terminal and a fixed network side must have at least one kind of a voice encoder/decoder.

In the mobile terminal side, a voice-encoding function is embedded inside the mobile terminal, and in the fixed network side, a voice-encoding function is located in a base station or a mobile switching center.

In voice communications at the time of each mobile-terminal origination or mobile-terminal termination, a transcoder is connected to the fixed network side. The transcoder decodes voice signals (up-link direction) originated by a mobile terminal and encodes the voice signals (down-link direction) terminated by a mobile terminal. If one voice communicator party is a mobile terminal and the other party is, for example, a subscriber of a public telephone network (PSTN), this method enables a normal operation without any problem.

In the case of a mobile-terminal/mobile-terminal communications (MM connection) where the opposite party in a mobile-terminal origination is a mobile terminal, a mobile communications network includes a transcoder between an origination side mobile terminal and a mobile switching center, and a second transcoder is located between a called side mobile terminal and a mobile switching center (the same mobile switching center or a different one). For each of these transcoders, two transcoder units are connected in series for each MM connection communication, and thereby the voice-encoding/decoding operation of the transcoder degrades voice quality.

For this reason, a specification of tandem-free operation (TFO) is recommended in order to prevent tandem-encoding. (The TFO recommendation in 3GPP2 which specifies the technical specification of cdma2000 is "A.S 0004", and it is "JP-3GB-A.S 0004" in TTC recommendations. The TFO recommendations specifying the technical specification of W-CDMA are "TS23. 053" and "TS28. 062".) This TFO establishes synchronization between the first and second transcoders in a voice band. If they are synchronous, a TFO is performed (specifically, neither the first nor second transcoders are used). If they are asynchronous, the voice-encoding/decoding operation of the transcoder is performed (PCM mutual conversion between a low transmission rate and 64 kbps).

FIG. 1 shows a system configuration for implementing a TFO.

In FIG. 1, mobile terminals MS1 and MS2 are connected through a base station 1, a TRAU (transcoder and rate adapter) 1, a fixed network 10, a TRAU2 and a base station 2. The MS1 encodes a call-connection request using an encoder, and inputs the encoded request to the TRAU1 through the base station 1. The TRAU1 negotiates with the MS1 about a voice-encoding type, determines the voice-encoding type and outputs a connection request to the TRAU2 through a decoder. The TRAU2 receives signals from the TRAU1 in an encoder and outputs the call-connection request to the MS2 through the base station 2. The MS2 decodes the received call-connection request, negotiates with the TRAU2 about a voice-encoding type and determines a voice-encoding type between the TRAU2 and MS2. Then, the TRAU1 and TRAU2 judges whether the voice-encoding type between the MS1 and TRAU1 and the voice-encoding type between the MS2 and TRAU2 match (for example, whether the transmission rates are the same) through the encoder and decoder, respectively. If they match and are synchronous, the TRAU1 and TRAU2 enable voice signals from the MS1 and MS2 to bypass the encoder and decoder, respectively, and enable the MS1 and MS2 to communicate through an up TFO and down TFO, respectively. If the voice-encoding type on the MS1-side and the voice-encoding type on MS2-side do not match, the TFO described above is not performed, communications are established by converting the signals received from the MS into signals to be transmitted on the fixed network 10 using the encoder and by converting the signals received from the fixed network 10 into signals to be transferred to the MS using the decoder.

If the kind of a voice code supported by both mobile terminal and fixed network sides is a single type at the time of MM connection communications, it is strongly anticipated that the connection becomes the MM connection by a TFO. However, since the kind of voice code supported by mobile terminal and fixed network sides becomes multiple types in the future, it is considered that there is a low possibility that the communications may become MM connection communications by a TFO. This is because at the time of MM connection, the voice-encoding type on an origination side and the voice-encoding type of a termination side are independently determined and then the signals are synchronized in a voice band by a TFO.

FIG. 2 is a sequence chart showing a connection between mobile terminals.

It is assumed that a call connection request is transmitted from a mobile terminal MS1. The call connection request is transmitted from the mobile terminal MS1 to both a base station BTS and a base station control center BSC1. Here, the voice-encoding type (transmission rate and the like) on an origination side is determined between the mobile terminal MS1 and the base station BTS/base station control center BSC1. Then, the call connection request is transferred from the base station BTS/base station control center BSC1 to a mobile switching center MSC1, is switched and is transferred to a mobile switching center MSC2. Then, the call connection request is transferred from the mobile switching center MSC2 to the base station BTS/base station control center BSC2 on a termination side. Then, the call connection request is reported from the base station BTS/base station control center BSC2 to a mobile terminal MS2 on the termination side. At this moment, the voice-encoding type on the terminating side is determined between the mobile terminal MS2 and the base station BTS/base station control center BSC2. An attempt is made to synchronize the TRAU of the base station BTS/base station control center BSC1 on the origination side and the TRAU of the base station BTS/base station control center BSC2. If they are synchronous, a TFO is performed (both a decoder and an encoder are bypassed).

FIG. 3 shows the format of a switching office side signal in a PDC. FIG. 4 shows a TFO frame structure in a CDMA EVRC speech codec.

FIG. 3 shows a frame format in the case where a TFO is performed in a PDC, and it is judged whether a voice-encoding type on an origination side and a voice-encoding type on a termination side match and are synchronous, using bits F0 to F15 shown in FIG. 3. If it is judged that they are synchronous, information about a low bit rate (V.SELP) is superposed on a slashed part shown in FIG. 3 and necessary control information is exchanged.

In FIG. 4, a bit C5 is an embedded TFO message indicator bit and indicates whether a frame includes a message on a TFO. Although negotiation is made between a mobile terminal and a base station/base station control center prior to a TFO, this negotiation is made by embedding a voice-band signal in a part of Other C bits shown in FIG. 4 (1) and exchanging information. If a TFO is performed, information about a low bit is superposed on a part of Other D bits shown in FIG. 4 (2) and information needed for a TFO is transmitted/received.

FIG. 5 is a sequence chart showing an origination/termination connection in the prior art.

First, an origination message is transmitted from a mobile terminal MS1 to start communications. Upon receipt of this message, a base station BS1 transmits a reply message (base station ack order) to the mobile terminal. The base station BS1 also transmits a resource use permission request (complete L3info:CM service request) to a mobile switching center MSC-a. Upon receipt of this request, the mobile switching center MSC-a transmits an initial address message (IAM) to a mobile switching center MSC-b. In response to this message, the mobile switching center MSC-b transmits a paging request to a base station BS2. The request is transmitted to a mobile terminal MS2 through the base station BS2 as a page message. A "connect call U (ACM)" is also transmitted from the mobile switching center MSC-b to the mobile switching center MSC-a.

In response to the paging request, the mobile terminal MS2 returns a page response message to the base station BS2. The base station BS2 returns a paging response to the mobile switching center MSC-b. The base station BS2 returns the reply message (base station ack order) to the mobile terminal MS2.

Upon receipt of the resource use permission request, the mobile switching center MSC-a determines a codec to be used and transmits an assignment request to the base station BS1. Upon receipt of this request, the base station BS1 notifies the mobile terminal MS1 of the codec to be used by a channel assignment message. Then, the mobile terminal MS1 transmits a message declaring a channel to be used (Tch preamble) to the base station BS1. The base station BS1 returns a "BS ack order" to the mobile station MS1, and the mobile terminal MS1 returns an "MS ack order" to the base station BS1. Then, the base station BS1 transmits a service connection message (service connect message) to the mobile terminal MS1. In response to this, the mobile terminal MS1 returns a service connection completion message (service connect completion) to the base station BS1. Upon receipt of the service connect completion message, the base station BS1 transmits a resource assignment completion message (assignment complete) to the mobile switching center MSC-a. Then, the mobile switching center MSC-a transmits a ring-back tone (alert with info) to the mobile terminal MS1.

Upon receipt of an assignment request from the mobile switching center MSC-b, the mobile terminal MS2 also performs the same process described above, and determines a codec to be used in the mobile terminal MS2. Then, the base station BS2 transmits "alert with info" to the mobile terminal MS2, and the mobile terminal MS2 transmits an "MS ack order" to the base station BS2. Then, the mobile terminal MS2 transmits a "service connect message" to the base station BS2. Then, the base station BS2 returns a "BS ack order" to the mobile terminal MS2 and also transmits a "service connect message" to the mobile switching center MSC-b. The mobile switching center MSC-b transmits a reply message (ANM) to the mobile switching center MSC-a, and the mobile switching center MSC-a transmits a "service connect message" to the mobile terminal MS1.

Thus, the mobile terminals MS1 and MS2 are connected.

If a TFO is performed in the procedure described above, for example, the voice encoding on the origination side becomes an "encoding type A". If the voice encoding on a termination side is determined to be an "encoding type B", the signals cannot be synchronized in a voice band by a TFO even if synchronization is attempted. As a result, the first and second transcoders described earlier are connected and voice quality is degraded. (If both of the mobile terminals select the same encoding type, tandem encoding can be prevented since they can be synchronized by a TFO.)

SUMMARY OF INVENTION

An object of the present invention is to provide in a mobile communications system where a plurality of voice-encoding types are supported, a communications system where a tandem encoding ratio in a recommended TFO is reduced at the time of MM connection communications and voice quality in the MM connection communications is improved.

The communications system of the present invention is provided with a transcoder for encoding/decoding signals when terminals communicate through a fixed network and a TFO (tandem-free operation) function for enabling terminals to communicate without using the transcoder. The communications system comprises a detection means for judging whether the terminals use a TFO function during communications and storage means for storing both a voice-encoding type used when a terminal communicates with a specific terminal and information about whether a TFO function is used in relation to the dial number of the specific terminal. When the terminal communicates with the specific terminal the second time, a communications setting, which has a high possibility of using a TFO function, is selected, based on the storage content of the storage means.

One communications terminal of the present invention corresponds to a plurality of voice-encoding types. The communications terminal comprises storage means for storing information about at least one voice-encoding type out of the plurality of voice-encoding types, based on the identification information of a communications terminal which is the opposite party, and transmitting means for transmitting at least one voice-encoding type stored in relation to the communications terminal, which is the opposite party in the communications, to the network when communications are conducted.

Another communications terminal of the present invention is used in a communications system provided with a function to designate a voice-encoding type to be used for each communications terminal to communicate and to perform control so that communications between communications terminals can be conducted without using the encoding/decoding function of a transcoder in a network if a voice-encoding type to be used by the communications terminals to communicate match. The communications terminal comprises storage means for storing information about a voice-encoding type used by the communications terminal itself, based on the identification information of a communications terminal, which is the opposite party in communications with the communication terminal, without using the encoding/decoding function of the transcoder, and transmitting means for transmitting information about the voice-encoding type stored in relation to the communications terminal, which is the opposite party in the communications, to the network when communications are conducted.

Another communications terminal of the present invention is used in a communications system provided with a function to designate a voice-encoding type used for each communications terminal to communicate, and to perform control so that communications between communications terminals can be conducted without using the encoding/decoding function of a transcoder in a network if the voice-encoding types used by the communications terminals to communicate match. The communications terminal comprises storage means for storing information about a voice-encoding type used by the communications terminal itself, based on the identification information of a communications terminal, which is the opposite party in communications with the communications terminal, using the encoding/decoding function of the transcoder, and transmitting means for transmitting information about another voice-encoding type that is different from the voice-encoding type stored in relation to the communications terminal, which is the opposite party in the communications, to the network and to which the communications terminal itself can correspond in communications.

Another communications terminal of the present invention is used in a communications system provided with a function to designate a voice-encoding type used for each communications terminal to communicate, and to perform control so that communications between communications terminals can be conducted without using the encoding/decoding function of a transcoder in a network if voice-encoding types to be used by the communications terminals to communicate match. The communications terminal comprises storage means for storing both information about a voice-encoding type used by the communications terminal itself in communications with the opposite party, and information about whether communications are conducted without using the encoding/decoding function of the transcoder, based on the identification information of a communications terminal, which is the opposite party, and transmitting means for transmitting information about the voice-encoding type used in relation to the communications terminal, which is the opposite party in communications, to the network.

Another communications terminal of the present invention is used in a communications system provided with a function to designate a voice-encoding type used for each communications terminal to communicate, and to perform control so that communications between communications terminals can be conducted without using the encoding/decoding function of a transcoder in a network if voice-encoding types to be used by the communications terminals to communicate match. The communications terminal comprises storage means for storing both information about a voice-encoding type used by the communications terminal itself in the latest communications with the opposite party, and information about whether communications are conducted without using the encoding/decoding function of the transcoder, based on the identification information of a communications terminal, which is the opposite party, and transmitting means for transmitting information about a voice-encoding type used in relation to the communications terminal, which is the opposite party in the communications, to the network.

The communications system of the present invention is provided with both a function to designate a voice-encoding type used for each communications terminal to communicate, and to perform control so that communications between communications terminals can be conducted without using the encoding/decoding function of a transcoder in a network if voice-encoding types to be used by the communications terminals to communicate match, and notification means for notifying at least one communications terminal in communications of the information that communications are or has been controlled so that the communications can be conducted between communications terminals without using an encoding/decoding function if such control is or has been exercised.

According to the present invention, since it is stored whether a TFO function has been used in the previous communications and whether communications are conducted in the same setting as that of the previous communications if a TFO function has been used, there is a high possibility that communications may be conducted using a TFO function.

If a TFO function has not been used in the previous communications, by communicating in a setting different from that of the previous communications, there is a high possibility of using a TFO function in the current communications.

By using a TFO function as much as possible in this way, a tandem-encoding ratio is reduced and thereby voice communications with high quality can be implemented.

BRIEF DESCRIPTION OF THE DRAWINGS

FIG. 1 shows a system configuration for implementing a TFO.

FIG. 3 shows the format of a switching office side signal in a PDC.

FIG. 4 shows a TFO frame structure in a CDMA EVRC speech codec.

FIG. 7 explains the first preferred embodiment of how to notify an MS of synchronization information.

FIG. 12 explains the sixth preferred embodiment of how to notify an MS of synchronization information.

FIG. 20 is a sequence chart showing the process flow of one preferred embodiment of the present invention.

DESCRIPTION OF THE PREFERRED EMBODIMENTS

Figure 2:
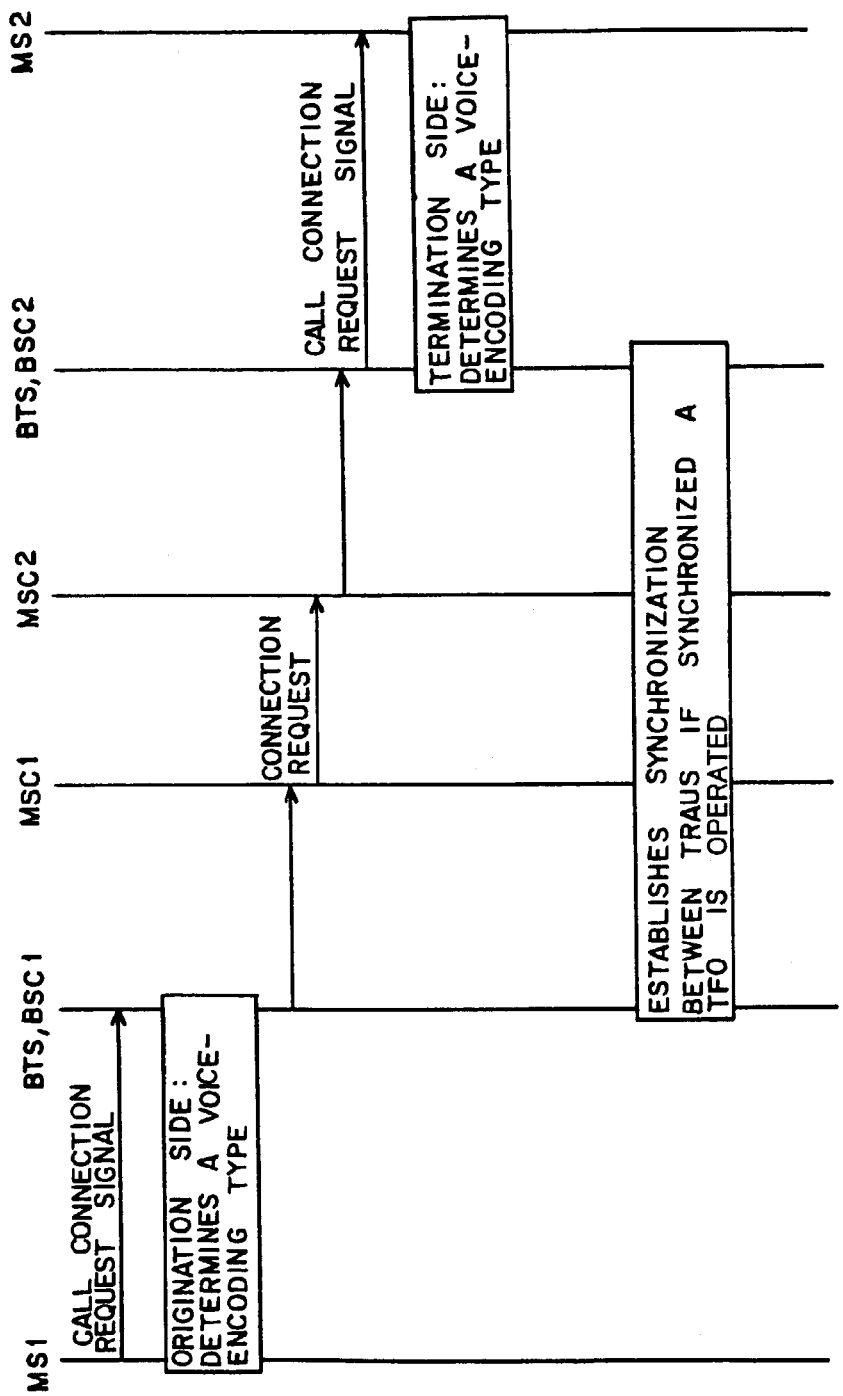
FIG. 2 is a sequence chart showing a connection between mobile terminals.
Figure 5:
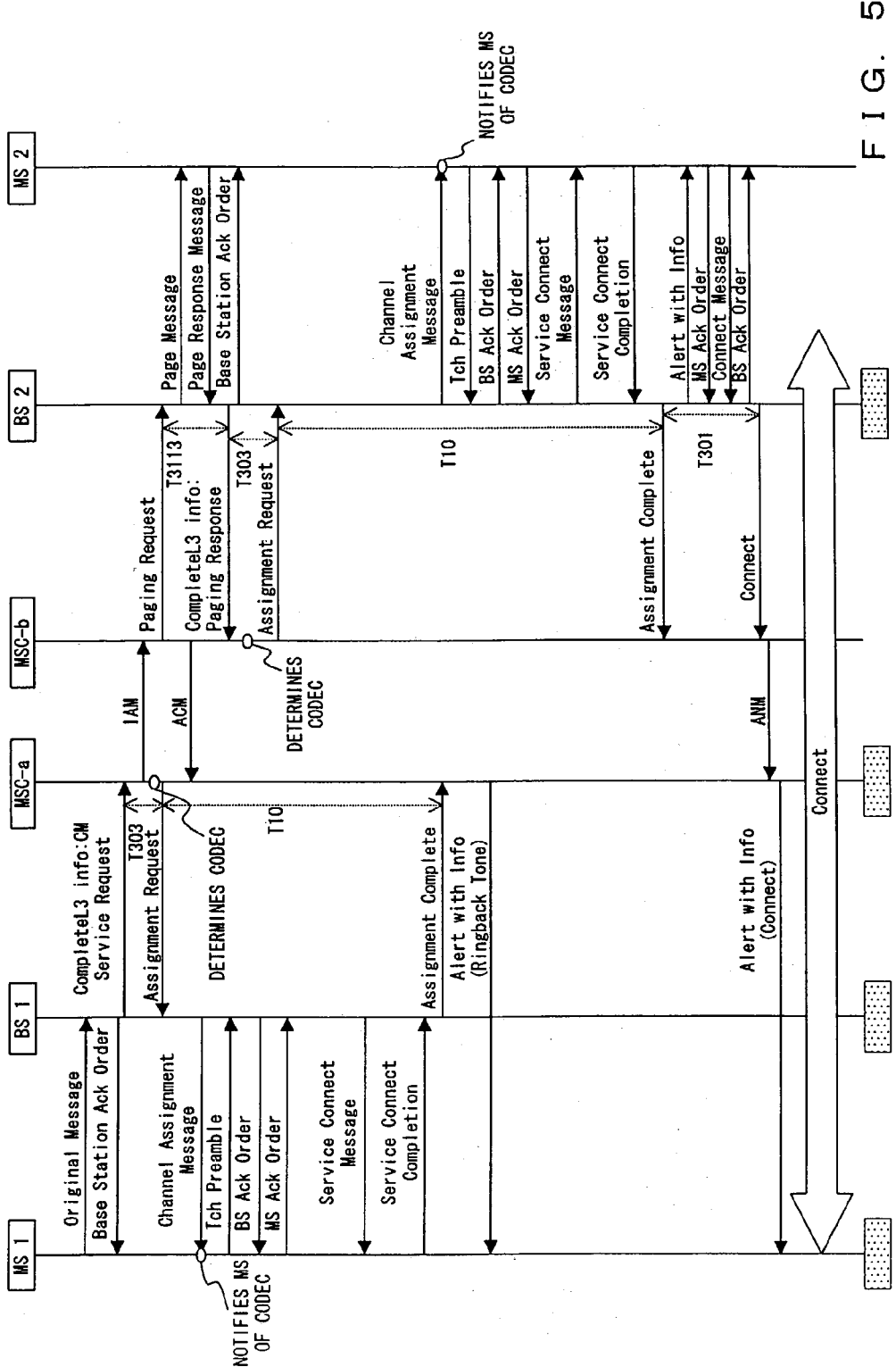
FIG. 5 is a sequence chart showing an origination/termination connection in the prior art.

In the preferred embodiment of the present invention, a mobile terminal comprises, for example, means for relating a memory dial to a voice-encoding type used in the previous communications, and information about whether tandem encoding has been prevented at that moment, and it is judged which voice-encoding type is used with priority at the time of a subsequent memory-dial origination when a call connection request is issued, based on the result of the previous communications.

Similarly, a mobile terminal comprises means for managing a dial (re-dial) history and relating a re-dial to a voice-encoding type used in the previous communications, and information about tandem encoding has been prevented at that moment, and it is judged which voice-encoding type is used with priority at the time of a subsequent memory-dial origination when a call connection request is issued, based on the result of the previous communications.

Furthermore, if a call is manually dialed and originated from a mobile terminal, information stored in means for relating a memory dial to a voice-encoding type used in the previous communications, and information about whether tandem encoding has been prevented at that moment or means for relating a re-dial to a voice-encoding type used in the previous communications, and information about tandem encoding that has been prevented at that moment is retrieved and it is judged which voice-encoding type is used with priority at the time of subsequent memory-dial origination when a call connection request is issued.

As to whether tandem encoding is or has been prevented, the preferred embodiment comprises means for notifying a mobile terminal of the information from a fixed network side from when communications start and until when the communications terminate. Alternatively, a mobile terminal comprises a voice soft-judgment decoding process unit. In this case, this soft-judgment decoding process unit measures quality state in communications and judges whether tandem encoding is or has been prevented.

According to the MM connection procedure of a normal mobile communications system, two transcoders are used for the MM connection. Although as means for preventing this tandem connection, a specification of TFO is recommended, this TFO can be implemented only when both communications terminals select the same voice-encoding type.

If a plurality of voice-encoding types are supported in a mobile terminal (and on a fixed network side), a voice-encoding type is independently determined for each MM connection communications between a mobile terminal and a fixed network. Therefore, there will be a low possibility that two mobile terminals may select the same voice-encoding type. However, if tandem encoding is prevented by using the means described above and using both a previous voice-encoding and a result on whether tandem encoding at that moment is prevented, a call connection request can be issued to the fixed network using the same voice-encoding type at the time of subsequent origination. If tandem encoding is not prevented, a possibility of selecting the same voice-encoding type as the opposite mobile terminal can be improved by selecting a voice-encoding type other than the type previously used at the time of subsequent origination.

The preferred embodiment of the present invention is also applicable to any mobile communications system that supports digital voice transmission for reducing a transmission rate in order to reduce the band of a radio section in use, a voice-encoding/decoding technology and a function to prevent tandem encoding.

For example, an implementation method using a cdma2000 (CDMAMC) system, which is the third generation mobile communications system, is described below. However, the preferred embodiment of the present invention is not limited to this mobile communications system.

Figure 6:
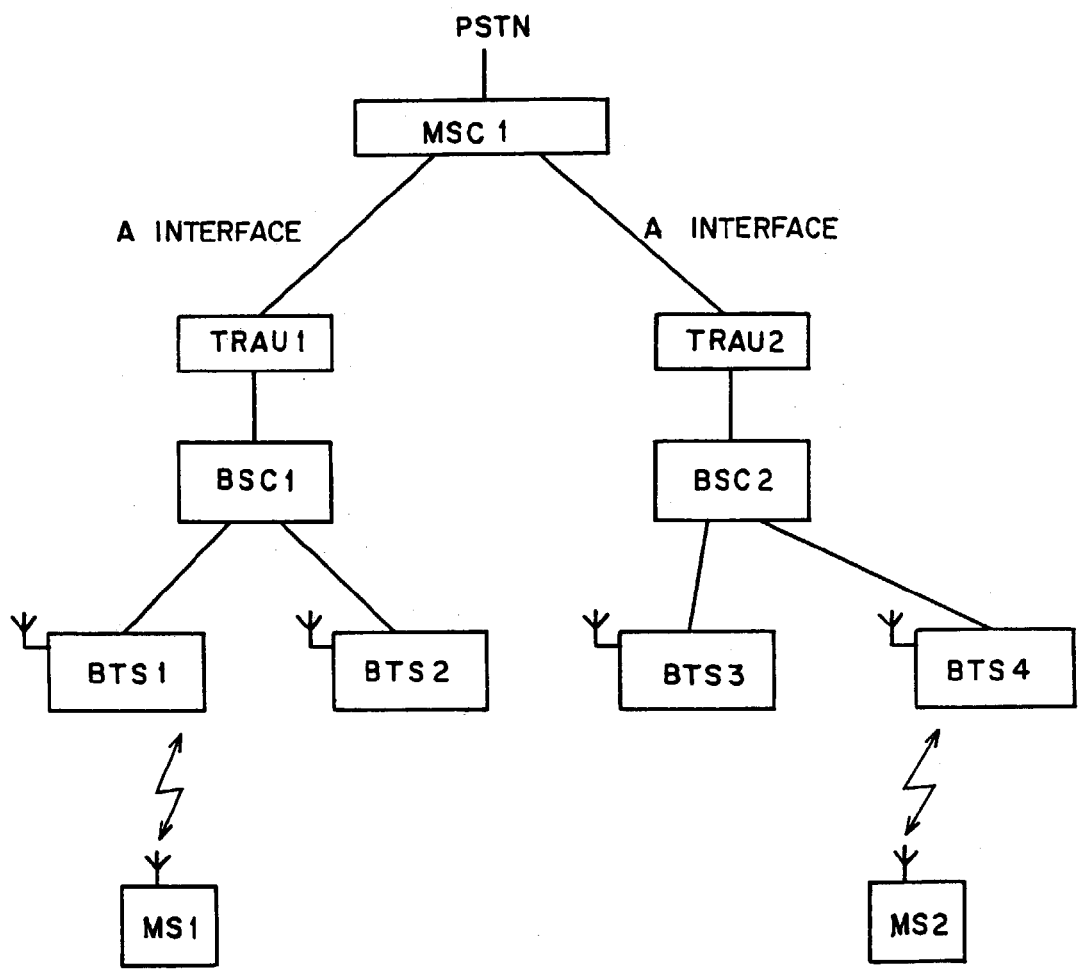
FIG. 6 shows the basic constituent components of a cdma2000 system.

FIG. 6 shows the basic constituent components of a cdma2000 system.

A mobile switching center MSC processes both incoming/outgoing call connections. This center performs the same function as the exchange of a public telephone network (PSTN). In addition, the center also has functions peculiar to mobile communications, such as subscriber location management and the like. A mobile terminal MS is connected to an MSC through a base station system. The base station system comprises a base station control center BSC and base stations BTS. One BSC controls many BTSs.

The cdma2000 system is completely digitized, and both voice/data transmissions are digitized. Thus, voice quality can be uniform. Typical voice-encoding methods used for voice transmission are CDMA and EVRC (IS-127: U.S. TIA Recommendation). However, there is also CDMA Q8 (IS-96-C: U.S. TIA Recommendation), a CDMA Q13 (IS-733: U.S. TIA Recommendation) and the like, and the number of voice-encoding types is anticipated to increase in the future. In the preferred embodiment of the present invention, the voice-encoding method is not described. This voice-encoding/decoding function is provided both in an MS and on a fixed network side.

On the network side, a variety of functions related to both voice encoding and rate correspondence are integrated on a transcoder unit TRAU (selection/distribution unit). A TRAU interface comprises a PCM interface of 64 kbps for an MSC (A interface) and an interface of a low rate (for example, 9.6 kbps) for a BTS. In cdma2000 Recommendation, the terms "uplink" and "downlink" are also used in relation to these interfaces. An uplink and a downlink are from a BTS to an MS and from an MSC to a BTS, respectively.

If an MS originates a call in a publicly known mobile communications system, related signals are transmitted from a BTS to an MSC. The center establishes, for example, a connection between a PSTN line and the line of an A interface. Simultaneously, a TRAU is assigned and MSC is connected to the A interface. The MSC further instructs the BSC to connect the BTS with which the calling side MS communicates, to the assigned A interface. The BSC establishes a connection between the A interface and the BTS with which the calling side MS communicates. The BTS independently establishes communications in a radio section. Therefore, a connection is established in which an MS, a BTS, a BSC, a TRAU and an MSC are connected in series.

If a publicly known mobile communications system handles MM connection communications between two MSs (MS-vs.-MS communications), the same communications connection described above is performed as far as a calling side MS is concerned. In this case, the MSC establishes a connection between an A interface line assigned to the calling side MS and an A interface line assigned to a called side MS. The A interface line on the called side MS is connected to the second TRAU. Thus, a connection from the second TRAU to the base station system on the called side MS is established. In other words, two TRAUs are connected in series for each MM connection communications and voice data are encoded/decoded two times. This is known as tandem encoding, and voice quality is degraded by extra encoding/decoding operations.

For this reason, synchronization is established between the TRAUs, and if the synchronization is established, tandem encoding can be prevented. In other words, if synchronization is established between TRAUs, the respective TRAUs simply transmit/receive signals between each other without voice encoding/decoding. As a result, voice encoding is performed only in an MS, and there is no need for signals to be converted to the conventional PCM (64 kbps) between TRAUs. Thus, voice quality can be remarkably improved, compared with the conventional tandem coding. However, to establish synchronization between TRAUs, as described above, two TRAUs must select the same voice-encoding type. Therefore, tandem encoding cannot be prevented.

According to the preferred embodiment of the present invention, a call is originated from MS1 to MS2 so that the TRAUs can select the same type voice encoding method. If they enter MM connection communications, both a TRAU synchronization result on whether synchronization can be established between TRAUs at that moment and a used voice-encoding type are stored in a mobile terminal (in this example, in an MS1) along with the dial number of an MS2. Then, if the TRAU synchronization result is synchronous (that is, if tandem encoding is prevented), the same used voice-encoding type as used in the previous communications is used, based on the previous TRAU synchronization result and used voice-encoding type used at the time of subsequent origination. If the previous TRAU synchronization result is asynchronous (that is, if tandem encoding is not prevented), a "used voice-encoding type" different from the previous communications is used.

The operation is described in detail below. MM connection communications are described, if otherwise specified.

An MS comprises a TRAU synchronization result storage unit and a voice-encoding type used history storage unit as well as a dial storage unit (memory dial/re-dial). The MS relates each dial number of the dial storage unit to the synchronization result at the time of the previous communications from the TRAU synchronization result storage unit, and further relates each dial number to the voice-encoding type used at the time of the previous communications from the voice-encoding type used history storage unit.

If the TRAU synchronization result is "synchronous" in the previous communications, the origination side MS1 transmits a signal with a previously used voice-encoding type superposed on the SERVICE_OPTION of an original message, which is a call connection request signal. In this case, there is a possibility that a voice-encoding type to be used is not supported in the origination side TRAU1 on the network side due to a change in location of a mobile terminal from the previous communications. Therefore, information about a voice-encoding type supported by the MS1 is indicated in ALT_SO (if nothing is set in ALT_SO, there is a possibility that the call connection fails since a TRAU1 cannot secure resources). The origination TRAU1 selects a voice-encoding type indicated in the SERVICE_OPTION of the original message from an MS1 (if there are the resources of the voice-encoding type, the origination side TRAU1 selects the voice-encoding type indicated in ALT_SO).

Then, an incoming signal is transmitted to an MSC on a termination side. A general page message, which is a terminating call request, is transmitted to the termination side MS12 through termination side BSC22 and BTS32. An MS2 identifies the phone number of the calling party, and if the dial number of the memory dial storage unit has the number, the MS2 judges whether a TRAU synchronization result in the previous communications with that number is "synchronous" or "asynchronous". If the previous communications is "synchronous", the MS2 transmit this answer signal with the previously used voice-encoding type superposed on the SERVICE_OPTION of a page response message, which is the answer signal. In this case, there is a possibility that a voice-encoding type to be used may not be supported in the termination side TRAU2 on the network side due to a change in location of a mobile terminal from the previous communications. Therefore, information about a voice-encoding type supported by the MS2 is indicated in ALT_SO (if nothing is set in ALT_SO, there is a possibility that the call connection fails since the TRAU2 cannot secure resources). The termination side TRAU2 selects a voice-encoding type indicated in the SERVICE_OPTION of the original message from the MS2 (if there are the resources of the voice-encoding type, the termination side TRAU2 selects the voice-encoding type indicated in ALT_SO).

By these operations, a possibility that tandem encoding is prevented in a TFO is remarkably increased.

Next, one example of the implementation method for judging whether tandem encoding is prevented since a TRAU becomes synchronous or tandem encoding is performed since a TRAU becomes asynchronous while an MS in specific communications is communicating is described.

In a specific communications state, for example, an MSC transmits a synchronization state confirmation request signal to a TRAU, and the TRAU transmits a synchronization result report (synchronous/asynchronous) to an MSC. The MSC notifies the MS of the TRAU synchronization result as an answer signal. This notification means, for example, superposes a disconnection signal at the time of the termination of communications on the answer signal and notifies the MS of the signal. The MS identifies this TRAU synchronization state, and stores the information along with a dial number with which the MS communicates and a used voice-encoding type. In this case, the dial number is stored in a memory dial storage unit or re-dial storage unit. The TRAU synchronization state is stored in a TRAU synchronization result storage unit, and the used voice-encoding type is stored in the voice-encoding type used history storage unit. These are uniquely related.

Then, when the MS subsequently originates/terminates, a voice-encoding type to be used is determined based on these pieces of stored information.

FIG. 7 explains the first preferred embodiment of how to notify an MS of synchronization information.

In FIG. 7, first, the control signal process function unit of an MSC issues a confirmation request of the state of use of a transcoder to the control signal process function unit of a TRAU (1). Then, the TRAU control signal process function unit makes an inquiry of the channel process unit of the TRAU about the state of use of the transcoder (2). In response to this inquiry, the TRAU channel process unit notifies the TRAU control signal process function unit of a used state reply for reporting the state of use of the transcoder (3). Upon receipt of this reply, the TRAU control signal process unit reports the state in use of the transcoder to the MSC control signal process function unit (4). Simultaneously, the TRAU control signal process function unit reports the state in use (synchronous or asynchronous) of the transcoder to the MS through a BSC. In this case, as described above, for example, this information is superposed on a disconnection signal at the time of the termination of communications and is reported to the MS.

Figure 8:
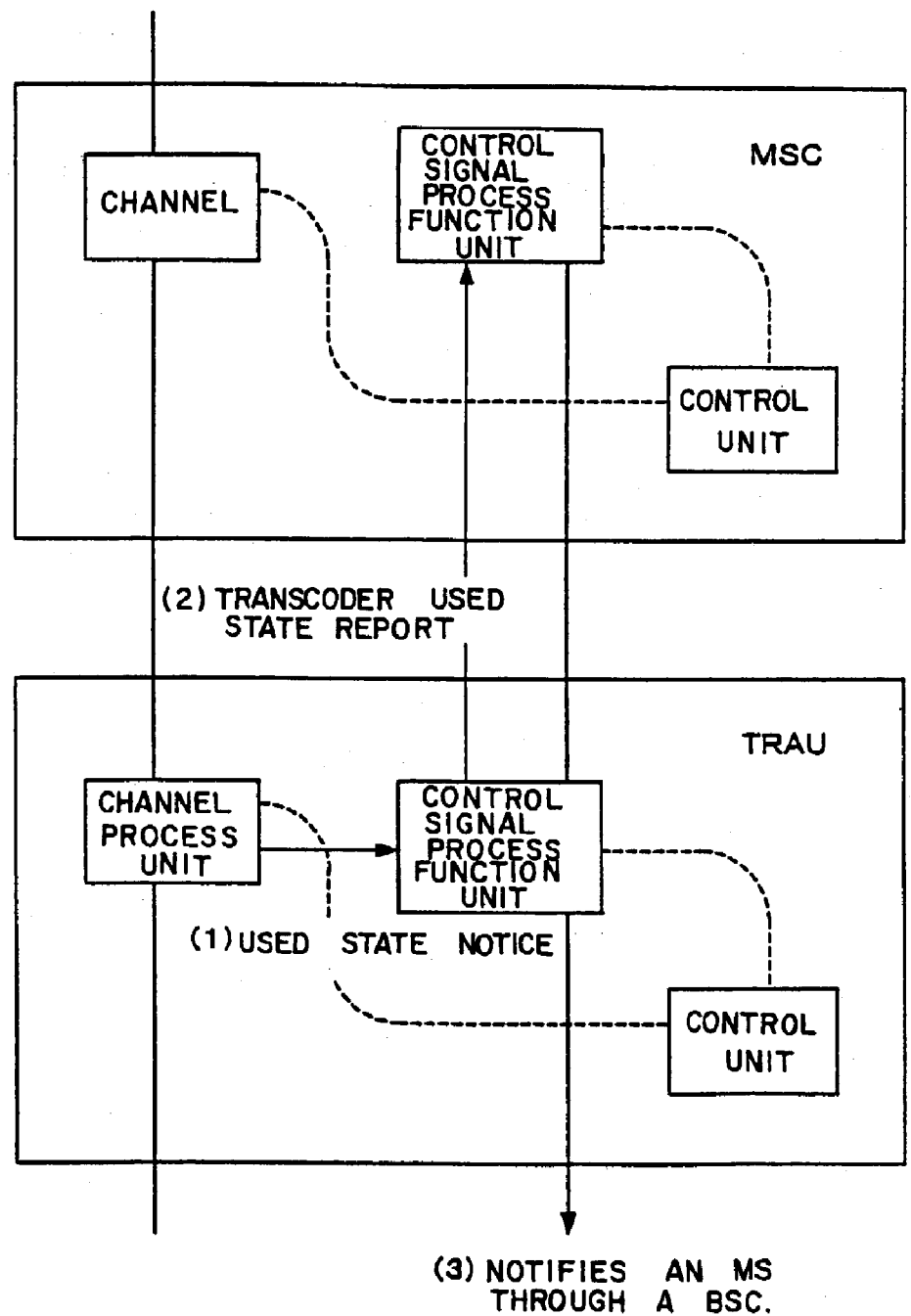
FIG. 8 explains the second preferred embodiment of how to notify an MS of synchronization information.

FIG. 8 explains the second preferred embodiment of how to notify an MS of synchronization information.

In FIG. 8, a TRAU channel process unit autonomously reports the state in use (synchronous/asynchronous) of a transcoder. First, a TRAU channel process unit notifies a TRAU control signal process function unit of the state in use of a transcoder (1). Upon receipt of the notice from the channel process unit, the TRAU control signal process function unit notifies an MSC control signal process unit of the state in use of the transcoder (whether the transcoder is used, or whether communications are synchronous or asynchronous) (2). Simultaneously, the TRAU control signal process function unit notifies an MS of the state in use of the transcoder (whether communications are synchronous or asynchronous) through a BSC (3).

Figure 9:
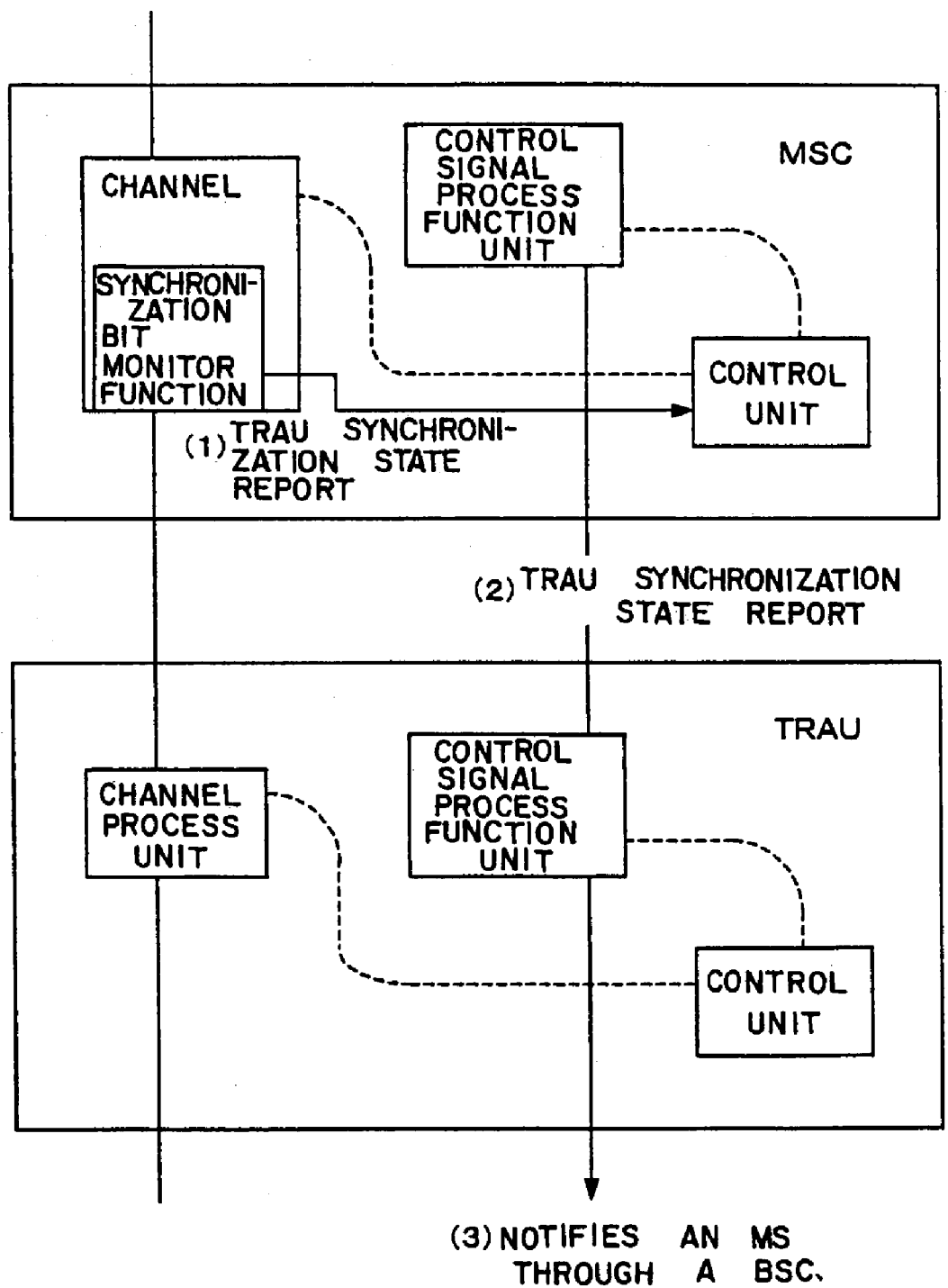
FIG. 9 explains the third preferred embodiment of how to notify an MS of synchronization information.

FIG. 9 explains the third preferred embodiment of how to notify an MS of synchronization information.

This preferred embodiment is provided with a synchronization bit monitor function to monitor the synchronization bit of a TFO in the channel of an MSC. The control unit of the MSC controls the synchronization bit monitor function. Whether the synchronization bit monitor function detects the synchronization bit of the TFO is reported to the MSC control unit (1), then, is reported to an MSC control signal process function unit and is reported to a TRAU control signal process function unit as a TRAU synchronization state report (2). Upon receipt of the TRAU synchronization state report from the MSC, the TRAU control signal process function unit interprets the report, and transmits to an MS through a BSC, information about whether communications are conducted in a synchronous or asynchronous state and the like, for example, superposed on a disconnection signal (3).

Figure 10:
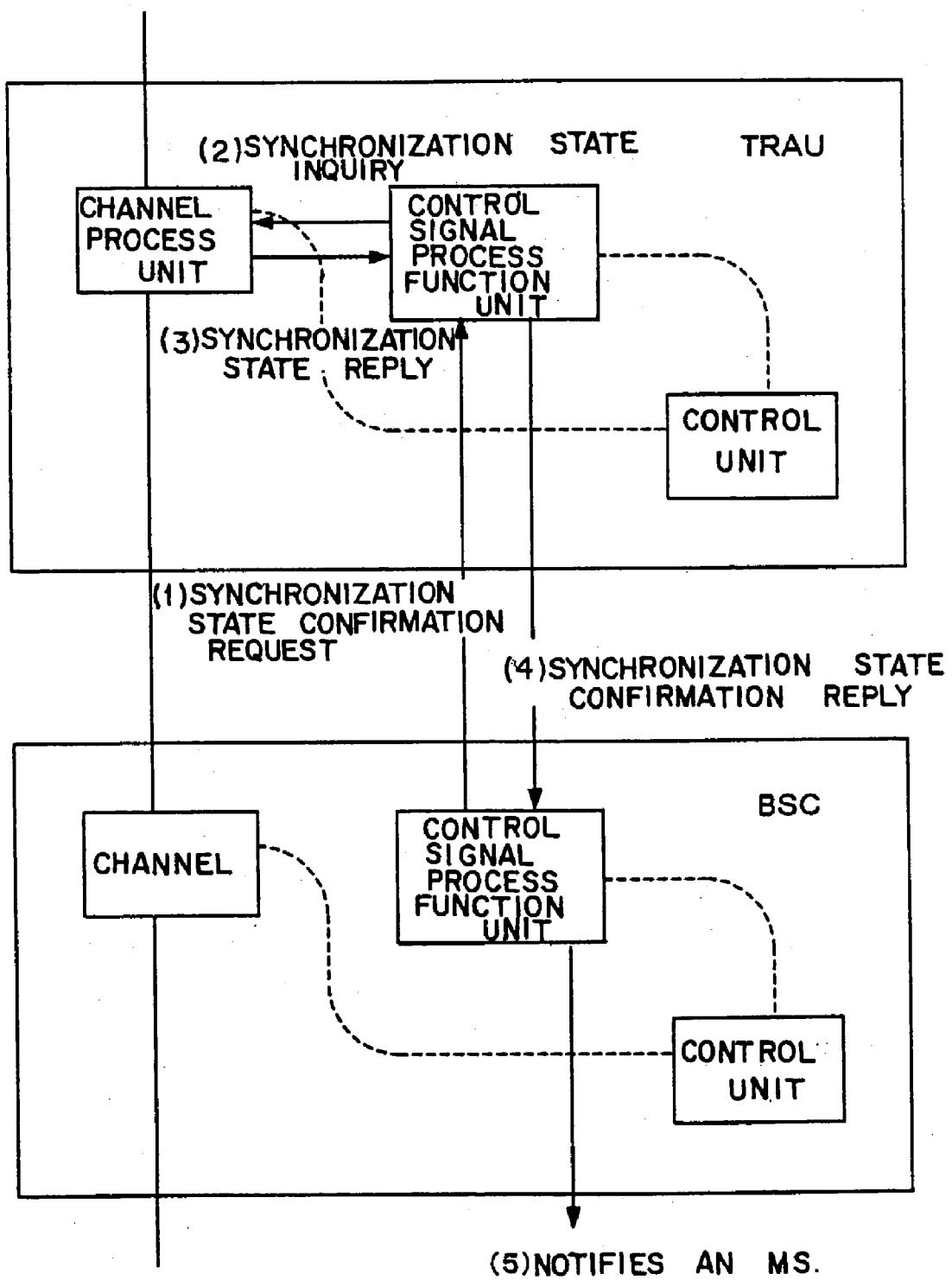
FIG. 10 explains the fourth preferred embodiment of how to notify an MS of synchronization information.

FIG. 10 explains the fourth preferred embodiment of how to notify an MS of synchronization information.

First, as the acquisition procedure of the synchronous/asynchronous information of communications, the control signal process function unit of a BSC notifies a TRAU control signal process function unit of a synchronization state confirmation request (1). Upon receipt of the synchronization state confirmation request notice from a BSC, the TRAU control signal process function unit makes an inquiry of a channel process unit about a synchronization state (2). Specifically, the TRAU control signal process function unit makes an inquiry about the state of use of a transcoder. In response to the inquiry about the synchronization state, the channel process unit notifies the TRAU control signal process function unit of the result as a synchronization state reply (3). Upon receipt of the synchronization state reply from the channel process unit, the TRAU control signal process function unit issues a synchronization state confirmation reply to a BSC control signal process function unit (4). The BSC control signal process function unit notifies an MS of whether a TFO is performed, specifically whether communications are synchronously conducted, which can be judged by the state of use of a transcoder, based on the synchronization state confirmation reply (5). The notice is made, for example, by superimposing the information on a disconnection signal.

Figure 11:
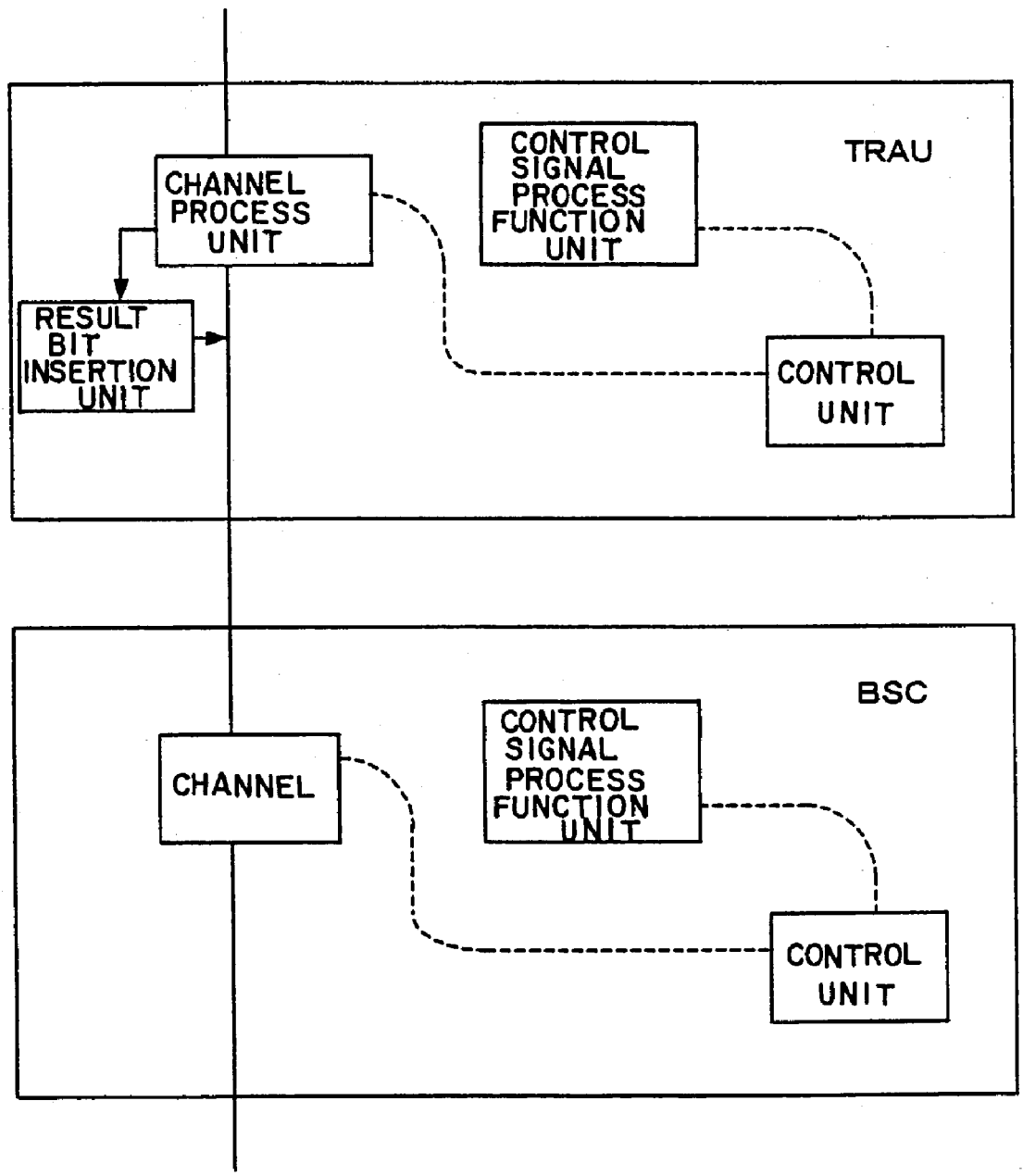
FIG. 11 explains the fifth preferred embodiment of how to notify an MS of synchronization information.

FIG. 11 explains the fifth preferred embodiment of how to notify an MS of synchronization information.

In FIG. 11, a result bit insertion unit is provided adjacent to a TRAU channel process unit. Specifically, the result bit insertion unit obtains the state of use of a transcoder obtained from the channel process unit, and superimposes information about whether a TFO is being performed on a part of voice information as a notification bit and notifies an MS of the information along with voice information. An MS obtains information about whether communications are conducted using a TFO, by checking the value of the notification bit included in the voice information.

FIG. 12 explains the sixth preferred embodiment of how to notify an MS of synchronization information.

FIG. 12 explains a method by which a TRAU channel process unit autonomously obtains the state of use of a transcoder and notifies an MS of being synchronous/asynchronous through a BSC.

First, a channel process unit obtains the state of use of a transcoder and notifies a TRAU control signal process function unit of the state of use as a TRAU synchronization state report (1). Then, the TRAU control signal process function unit notifies a BSC control signal process unit of a TRAU synchronization state report obtained from the channel process unit (2). Upon receipt of this report, a BSC control signal process unit notifies an MS of whether communications are synchronously conducted.

Figure 13:
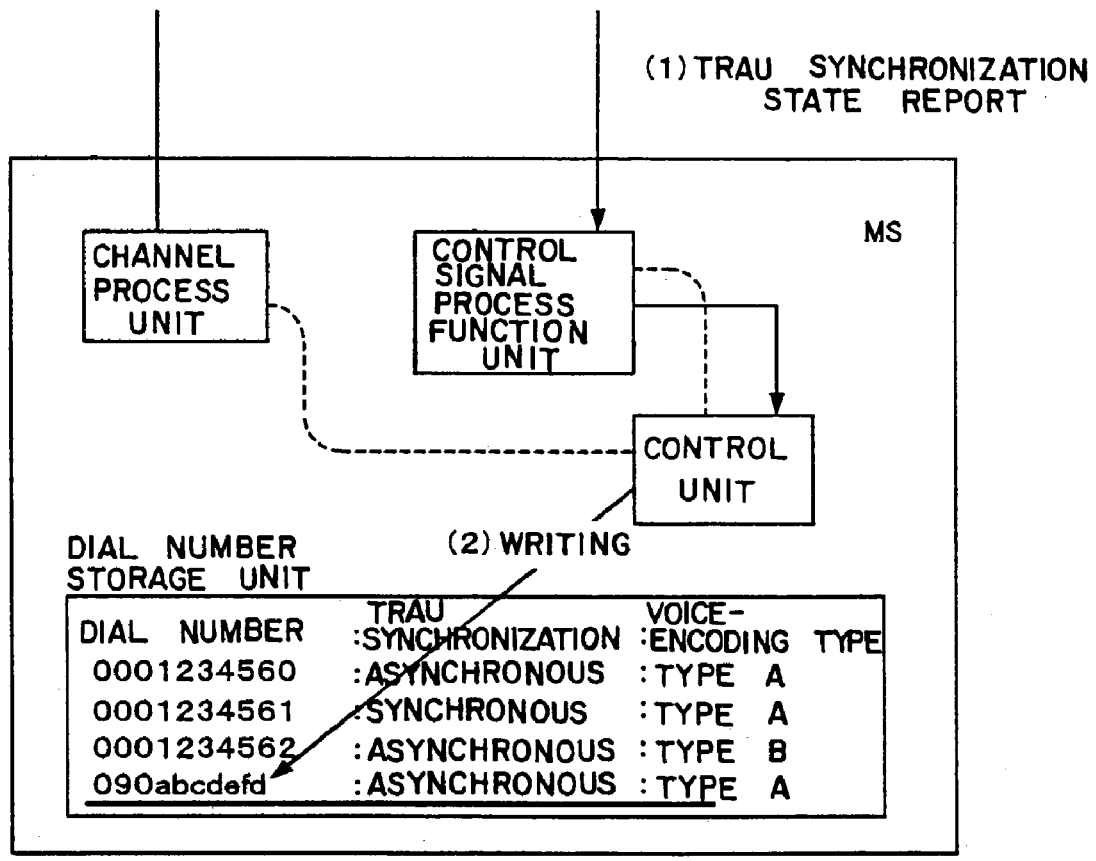
FIG. 13 explains the MS process in the case where synchronization information is received as a control signal.

FIG. 13 explains the MS process in the case where an MS receives synchronization information as a control signal.

In FIG. 13, if an MS control signal process unit receives a TRAU synchronization state report (1), the MS control signal process unit notifies a control unit of this information, and registers the phone number of the opposite party, a TRAU synchronization result and a voice-encoding type in a MS dial number storage unit (2).

Figure 14:
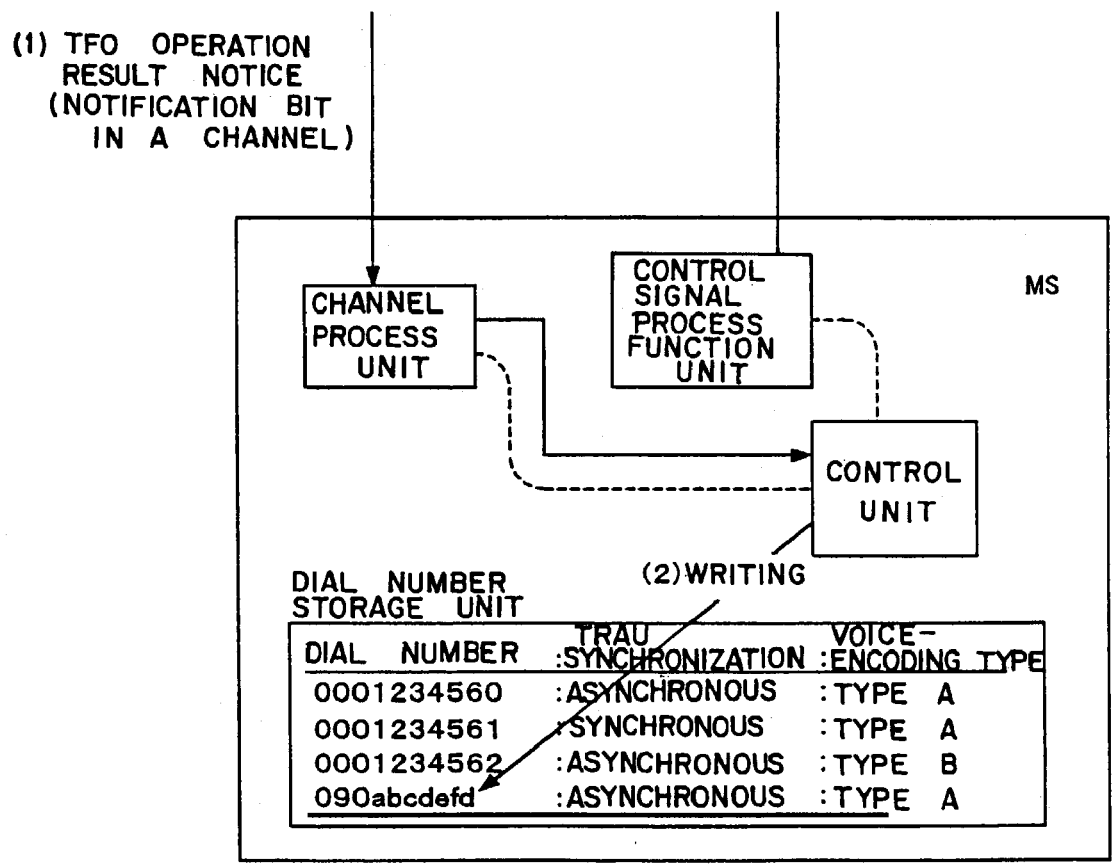
FIG. 14 explains the MS process in the case where synchronization information is received as a notification bit in a channel.

FIG. 14 explains the MS process in the case where an MS receives synchronization information as a notification bit in a channel.

In FIG. 14, if an MS channel process unit recognizes a notification bit inserted as a part of voice information (1), an MS channel process unit notifies a control unit of this information and the control unit registers the dial number of the opposite party, a TRAU synchronization result and a voice-encoding type in an MS dial number storage unit (2).

Figure 15:
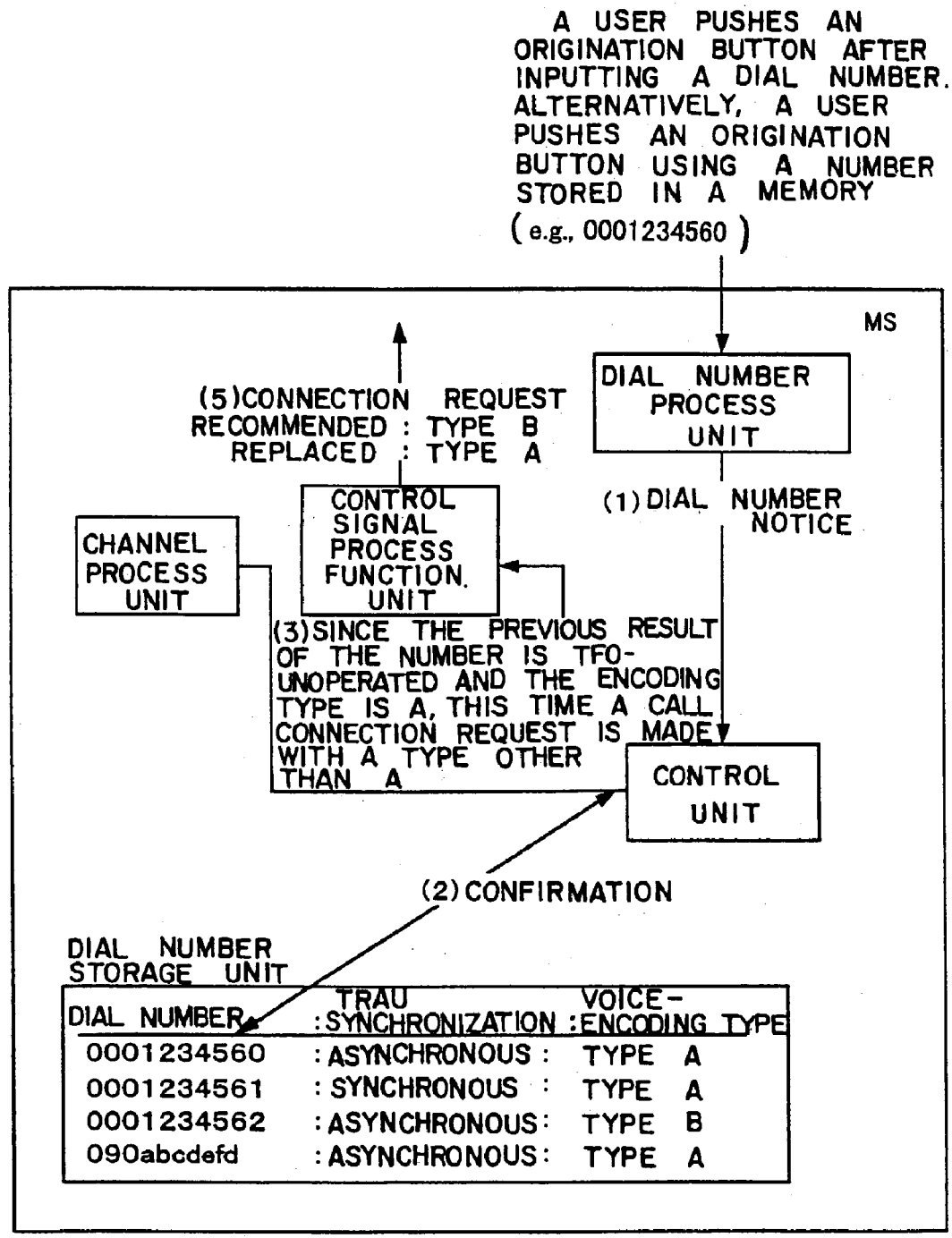
FIG. 15 explains the process of referring to a dial number storage unit when an MS originates a call.

FIG. 15 explains the process of referring to a dial number storage unit when an MS originates a call.

First, if a user inputs a dial number in an MS and pushes an origination button or pushes an origination button using a number stored in a memory, a dial number process unit detects this information. Then, the dial number process unit notifies a control unit of the dial number (1). The control unit judges whether a dial number storage unit stores the dial number obtained from the dial number process unit (2). In this example, since the dial number storage unit stores the dial number, it is judged that a TFO is not performed in the previous communications with the same number and the encoding type is A, based on both a corresponding stored TRAU synchronization result and a voice-encoding type that are obtained. Therefore, this time the control unit requests a call connection using a voice-encoding type other than A. The control unit notifies a control signal process function unit of this request (3). An MS control signal process function unit sets, for example, type B out of a plurality of types as a recommended voice-encoding type, sets type A as a replacement voice-encoding type and transmits a connection request (5).

Figure 16:
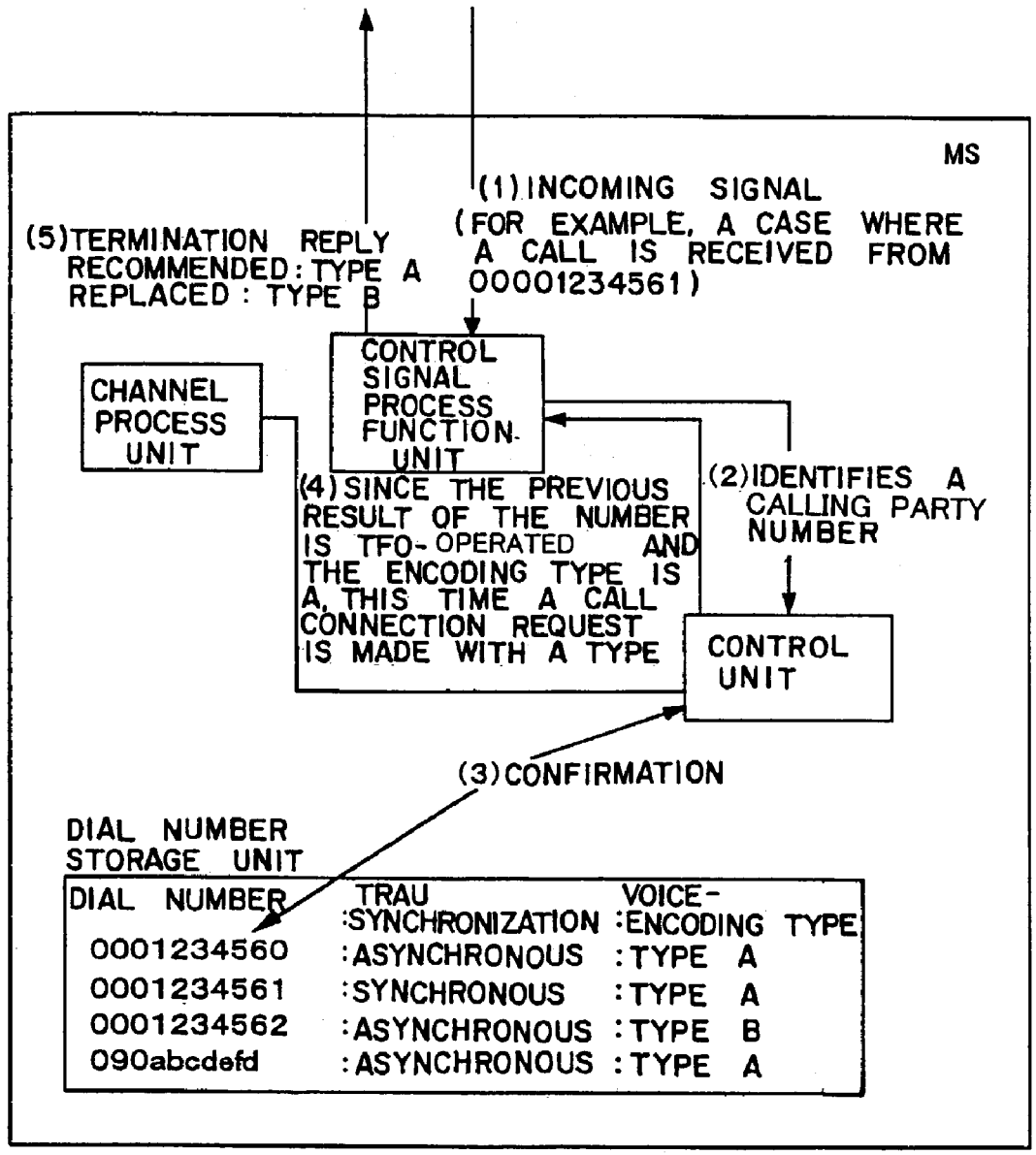
FIG. 16 explains the operation performed when a call is terminated at an MS.

FIG. 16 explains the operation performed when an MS receives a call.

First, if an MS control signal process function unit receives an incoming signal (1), a control unit identifies the calling party number (2) and judges whether a dial number storage unit stores the number (3). In this example, since the dial number storage unit stores the number, the control unit obtains both a corresponding TRAU synchronization result and a voice-encoding type. Since the previous communications with the number is TFO-operated and a voice-encoding type is A, this time the control unit instructs the control signal process function unit to issue a call connection request using type A (4). The control signal process function unit selects A as a recommended voice-encoding type, selects one type (in this example, B) as a replacement type from a plurality of types, and transmits a termination reply (5).

Figure 17:
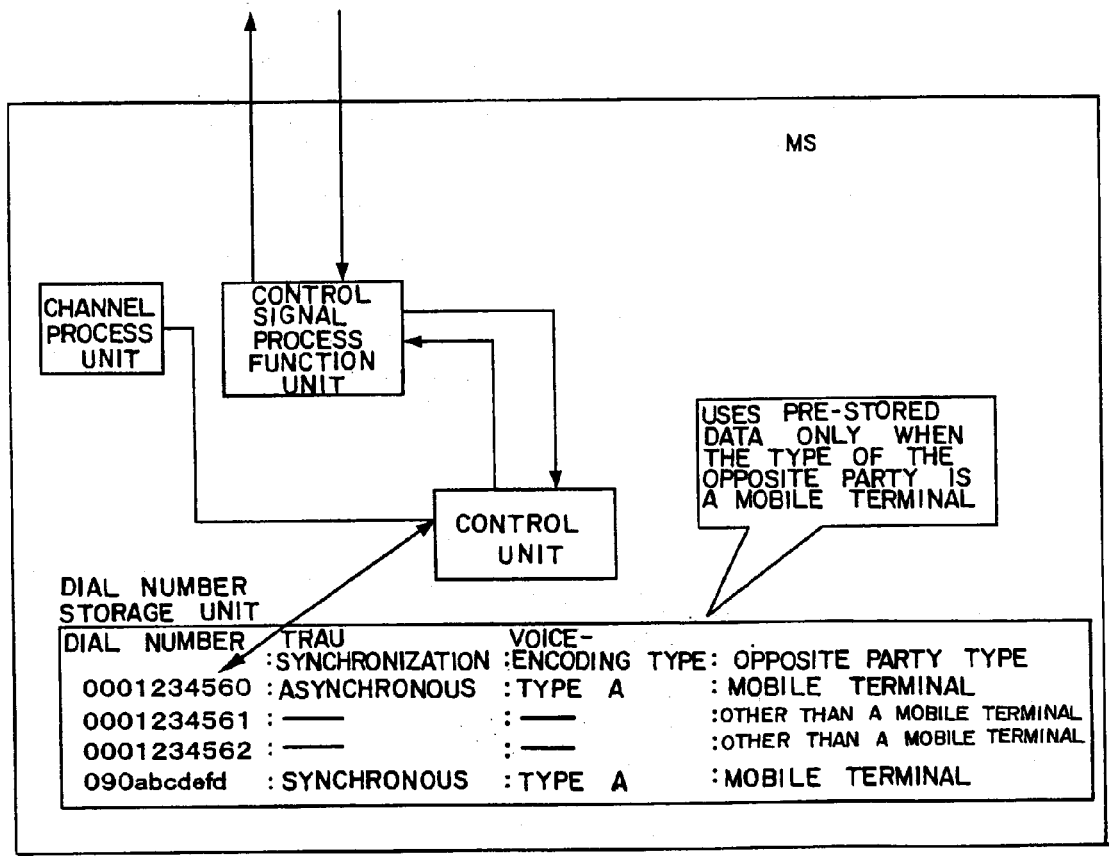
FIG. 17 shows another configuration of the dial number storage unit of an MS.

FIG. 17 shows another configuration of an MS dial number storage unit.

In FIG. 17, a dial number storage unit stores the telephone type of the opposite party in relation to a dial number. Since tandem encoding, which is a problem to be solved by the preferred embodiment of the present invention, occurs only in communications between mobile terminals, if a communications partner is other than a mobile terminal, for example, an ordinary fixed telephone set, the dial number storage unit does not store both a TRAU synchronization result and a voice-encoding type, and normal communications are conducted. If a communications partner is a mobile terminal, the dial number storage unit stores both the TRAU synchronization result and voice-encoding type in relation to the dial number, and performs the process of the preferred embodiment described above.

Figure 18:
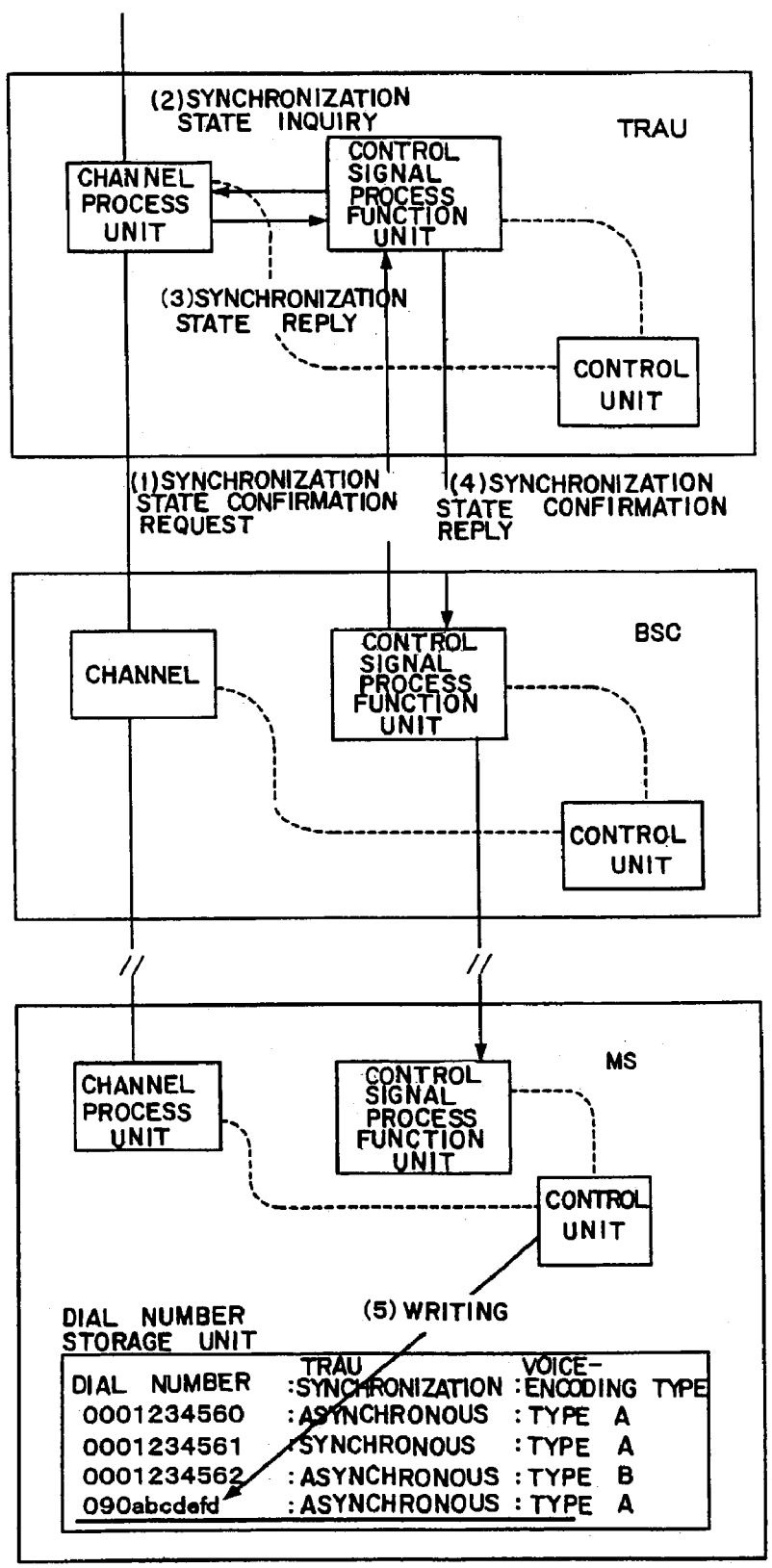
FIG. 18 shows the flow of the entire process of one preferred embodiment of the present invention.

FIG. 18 shows the entire process flow of one preferred embodiment of the present invention.

First, a BSC control signal process function unit issues a synchronization state confirmation request to a TRAU control signal process function unit (1). Then, the TRAU control signal process function unit makes an inquiry of a TRAU channel process unit about a synchronization state and obtains the state of use of a transcoder (synchronization state) from a TRAU channel process unit (3). Upon receipt of a synchronization state reply, the TRAU control signal process function unit issues a synchronization state confirmation reply to a BSC control signal process function unit and notifies the BSC control signal process function unit of whether communications are synchronously conducted (4). This reply is reported to an MS control signal process function unit as a control signal. Upon receipt of the reply, an MS control signal process function unit notifies a control unit of the received synchronization state information. The control unit stores the dial number of the opposite party, a TRAU synchronization result and a voice-encoding type in a dial number storage unit and terminates registration.

The information of the dial number storage unit stored in this way is used in the procedure described above and is also used to avoid tandem encoding.

Figure 19:
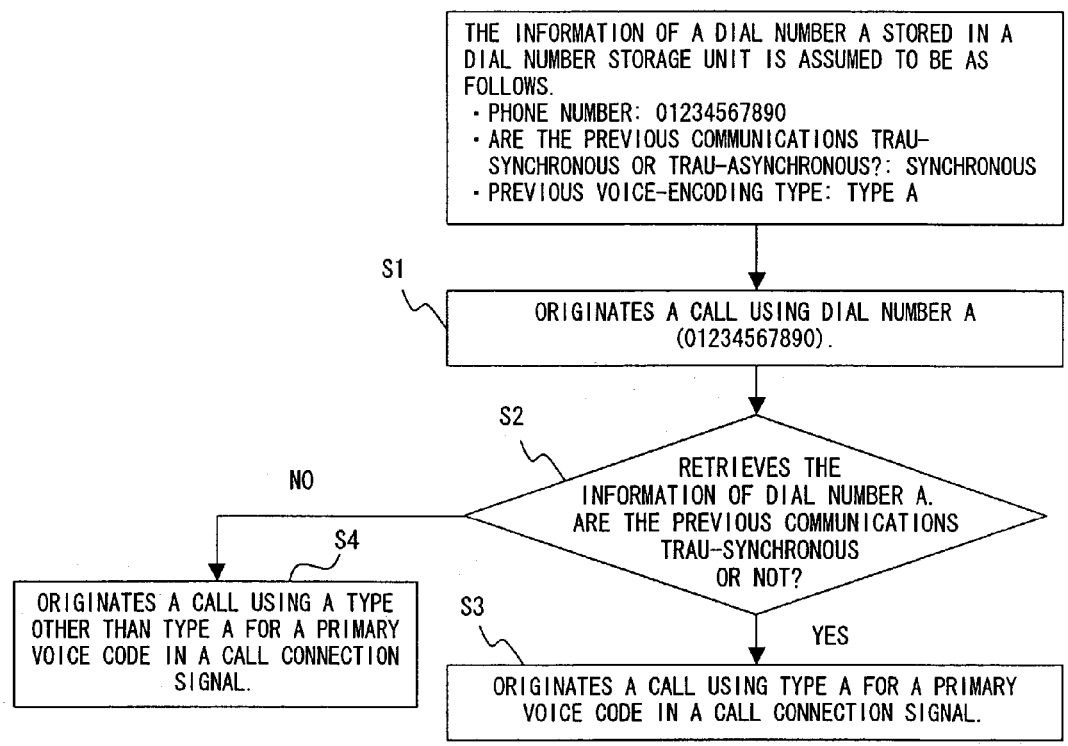
FIG. 19 is a flowchart showing both the storage information and process content of the dial number storage unit of an MS.

FIG. 19 is a flowchart showing both the storage information and process content of an MS dial storage unit.

The flowchart shown in FIG. 19 shows a case where an MS originates a call. First, it is assumed that the information of a dial number A stored in a dial number storage unit is a phone number, 01234567890, information about whether the previous communications are TRAU-synchronous/asynchronous is synchronous and the previous voice-encoding is type A. In step S1, an MS originates a call using a dial number A (0123456789), in step S2, the information about dial number A is retrieved and it is judged whether the previous communications are TRAU-synchronous. In this example, since communications are synchronous, the flow proceeds to step S3 and a call is originated using type A as a primary voice code (recommended voice-encoding type) in a call connection signal. If in step S2 the previous communications are judged to be "asynchronous", the flow proceeds to step S4 and a call is originated using a type other than A as the primary voice code in the call connection signal. Thus, a call connection to a communications partner is established.

FIG. 20 is a sequence chart showing the flow of one preferred embodiment of the present invention.

First, if a communications partner transmits a disconnection signal, an MSC issues a transcoder used state confirmation request to a TRAU and receives a transcoder used state confirmation report from the TRAU. Then, the MSC transmits a disconnection signal, including a TRAU synchronization result, to the BTS/BSC. The BTS/BSC transfers this disconnection signal to an MS without any process. Upon receipt of this disconnection signal, the MS extracts the TRAU synchronization result from the disconnection signal, relates both the TRAU synchronization result and voice-encoding type to a corresponding dial number, and stores the information in a dial storage unit. Then, the MS transmits a disconnection confirmation signal to the BTS/BSC. The disconnection confirmation signal is transmitted from the BTS/BSC to the MSC without any process, the line is disconnected and communications are terminated.

Although in the preferred embodiments described above, it is assumed that a dial number is automatically stored in the dial number storage unit, a user can also manually input a dial number. Specifically, a terminal possessor can input the dial number of a communications partner's terminal and can also input information about at least one voice-encoding type that corresponds to both the communications partner's terminal and the communications terminal itself. Two or more voice-encoding types can also be stored against one communications partner.

Although in the preferred embodiments described above, a dial number is used for information specifying a communications partner, the information is not limited to a dial number, and another piece of information, such as the name of the possessor of a communications terminal, the machine number of a communications terminal and the like can also be used for the information as long as the communications terminal of the opposite party can be identified.

According to the present invention, tandem encoding that easily occurs in communications between mobile terminals can be greatly reduced. Specifically, since tandem encoding degrades voice quality, by avoiding this degradation as much as possible, communications with high quality can be implemented even between mobile terminals.

What is claimed is:

1. A communications system that is provided with both a transcoder for encoding/decoding a plurality of signals when a plurality of terminals communicate through a network and a TFO (tandem-free operation) function to enable terminals to communicate without using a transcoder, comprising:
   a detection unit judging whether communications between the terminals are conducted using a TFO function; and
   a storage unit storing both a voice-encoding type used in communications with a specific terminal and information about whether the TFO function is used in relation to a dial number of the specific terminal, wherein
   in the second communications with the specific terminal, a communications setting that has a high possibility of using the TFO function is selected, based on a storage content of the storage unit.

2. The communications system according to claim 1, wherein a mobile switching center used for communications between terminals obtains information about whether the TFO function is used in the communications between the terminals and notifies the terminals of the information.

3. The communications system according to claim 1, wherein said transcoder judges whether the TFO function is used and notifies the terminals of the information.

4. The communications system according to claim 1, wherein a mobile switching center used for communications between terminals obtains information about whether communications are conducted using the TFO function by detecting a specific bit from data during communications and notifies the terminals of the information.

5. The communications system according to claim 1, wherein a base station control center used for communications between terminals makes an inquiry of said transcoder about whether the TFO function is used in current communications and notifies the terminals of a result.

6. The communications system according to claim 1, wherein the information about whether the TFO function is used is attached to a voice signal as specific information and is transferred.

7. The communications system according to claim 1, wherein the information about whether the TFO function is used is superimposed on a control signal and is transferred.

8. The communications system according to claim 1, wherein the information about whether the TFO function is used is superimposed on a disconnection signal transmitted at the time of communications termination and is transferred.

9. The communications system according to claim 1, wherein said storage unit stores a telephone type of an opposite terminal of the specific terminal in relation to a dial number of the opposite terminal in addition to a voice-encoding type and information about whether the TFO function is used.

10. A terminal that communicates using a TFO (tandem-free operation) function, comprising:
    a storage unit relating and storing a dial number of a communications partner, information indicating whether the TFO function has been used in previous communications with the communications partner and a voice-encoding type used in the previous communications; and
    a communications unit referring to a storage content of said storage unit and communicating with another terminal with a communication setting that has a high possibility of using the TFO function in communications with the other terminal.

11. A communications method that is provided with both a transcoder for encoding/decoding a plurality of signals when a plurality of terminals communicate through a network and a TFO (tandem-free operation) function to enable terminals to communicate without using the transcoder, comprising:
    judging whether communications between the terminals are conducted using the TFO function; and
    storing both a voice-encoding type used in communications with a specific terminal and information about whether the TFO function is used, in relation to a dial number of the specific terminal, wherein
    in the second communications with the specific terminal, a communications setting that has a high possibility of using the TFO function is selected, based on a storage content of the storage step.

12. A communications terminal that designates a voice-encoding type to be used for each communications terminal to communicate and if voice-encoding types to be used by the communications terminals to communicate are the same, performs control so that communications between the terminals can be conducted without using an encoding/decoding function of a transcoder in a network, comprising:
    a storage unit storing information about a voice-encoding type used by the communications terminal itself in communications with another communications terminal, which is an opposite party, are conducted without using the encoding/decoding function of the transcoder, in relation to identification information of the communications terminal, which is the opposite party;
    a transmitting unit transmitting the voice-encoding type information stored in relation to the communications terminal, which is the opposite party, in communications to a network.

13. A communications terminal that designates a voice-encoding type to be used for each communications terminal to communicate and if voice-encoding types to be used by the communications terminals to communicate are the same, performs control so that communications between the terminals can be conducted without using an encoding/decoding function of a transcoder in a network, comprising:
    a storage unit storing information about a voice-encoding type used by the communications terminal itself when communications with another communications terminal, which is an opposite party, are conducted using the encoding/decoding function of the transcoder, in relation to identification information of the communications terminal, which is the opposite party;
    a transmitting unit transmitting information of another voice-encoding type that is different from the voice-encoding type stored in relation to the communications terminal, which is the opposite party, and to which the communications terminal itself can correspond, in communications to a network.

14. A communications terminal that designates a voice-encoding type to be used for each communications terminal to communicate and if voice-encoding types to be used by the communications terminals to communicate are the same, performs control so that communications between the terminals can be conducted without using an encoding/decoding function of a transcoder in a network, comprising:
    a storage unit storing both information of the voice-encoding type used by the communications terminal itself in communications with a communication partner and information about whether the communications are conducted without using the encoding/decoding function of the transcoder, in relation to identification information of another communications terminal, which is an opposite party; and a transmitting unit transmitting information of the voice-encoding type stored in relation to the communications terminal, which is the opposite party, to a network in communications.

15. A communications terminal that designates a voice-encoding type to be used for each communications terminal to communicate and if voice-encoding types to be used by the communications terminals to communicate are the same, performs control so that communications between the terminals can be conducted without using an encoding/decoding function of a transcoder in a network, comprising:

a storage unit storing both information of the voice-encoding type used by the communications terminal itself in the latest communications with a communication partner and information about whether the communications are conducted without using the encoding/decoding function of the transcoder, in relation to identification information of another communications terminal, which is an opposite party; and a transmitting unit transmitting information of a voice-encoding type stored in relation to the communications terminal, which is an opposite party, to a network in communications.

* * * * *